US009769543B2

(12) United States Patent
Petrovic et al.

(10) Patent No.: US 9,769,543 B2
(45) Date of Patent: Sep. 19, 2017

(54) ENHANCED METADATA AND CONTENT DELIVERY USING WATERMARKS

(71) Applicant: Verance Corporation, San Diego, CA (US)

(72) Inventors: Rade Petrovic, San Diego, CA (US); Jian Zhao, San Diego, CA (US); Joseph M. Winograd, San Diego, CA (US)

(73) Assignee: Verance Corporation, San Diego, CA (US)

( * ) Notice: Subject to any disclaimer, the term of this patent is extended or adjusted under 35 U.S.C. 154(b) by 17 days.

(21) Appl. No.: 14/951,171

(22) Filed: Nov. 24, 2015

(65) Prior Publication Data

US 2016/0150297 A1    May 26, 2016

Related U.S. Application Data

(60) Provisional application No. 62/084,465, filed on Nov. 25, 2014.

(51) Int. Cl.
  *H04N 21/8358* (2011.01)
  *G10L 19/018* (2013.01)
  (Continued)

(52) U.S. Cl.
  CPC ..... *H04N 21/8358* (2013.01); *H04N 21/2353* (2013.01); *H04N 21/23892* (2013.01)

(58) Field of Classification Search
  CPC .......... H04N 21/8358; H04N 21/2353; H04N 21/23892; G10L 19/018; G06T 1/0071
  See application file for complete search history.

(56) References Cited

U.S. PATENT DOCUMENTS 6,122,610 A   9/2000 Isabelle
6,145,081 A   11/2000 Winograd et al.
(Continued)

FOREIGN PATENT DOCUMENTS

EP   1474924 A2   11/2004
EP   2439735 A1   4/2012
(Continued)

OTHER PUBLICATIONS

International Search Report and Written Opinion dated Jan. 21, 2016 for International Application No. PCT/US2015/046166, filed Aug. 20, 2015 (8 pages).
(Continued)

*Primary Examiner* — Nathan Flynn
*Assistant Examiner* — Tung T Trinh
(74) *Attorney, Agent, or Firm* — Perkins Coie LLP; Donald L. Wenskay

(57) ABSTRACT

Methods, systems and devices enable enhanced delivery of metadata, as well as auxiliary programs and services associated with a primary content. In one method, a primary content with pre-existing watermarks is received at a content distributor device. The pre-existing watermark include specific fields that allow retrieval of a first metadata. The values and boundary locations of the symbols of the pre-existing watermark messages are determined, and symbols of a new watermark message are embedded in the primary content to render the pre-existing watermarks undetectable. The new watermark message includes symbol values that different from those in the pre-existing watermark messages and enable retrieval of a second metadata. Upon transmission of the primary content to a client device, detection of the new watermark message, and initiation of a request by the client device, access to the first or the metadata, as well as associated programs or services, are enabled.

64 Claims, 8 Drawing Sheets

(51) Int. Cl.
*H04N 21/2389* (2011.01)
*H04N 21/235* (2011.01)

(56) References Cited

U.S. PATENT DOCUMENTS

| | | |
|---|---|---|
| 6,175,627 B1 | 1/2001 | Petrovic et al. |
| 6,427,012 B1 | 7/2002 | Petrovic |
| 6,430,301 B1 | 8/2002 | Petrovic |
| 6,490,579 B1 | 12/2002 | Gao et al. |
| 6,577,747 B1 | 6/2003 | Kalker et al. |
| 6,683,958 B2 | 1/2004 | Petrovic |
| 6,721,439 B1 * | 4/2004 | Levy ............... G06T 1/005 375/E7.089 |
| 6,792,542 B1 | 9/2004 | Lee et al. |
| 6,839,673 B1 | 1/2005 | Choi et al. |
| 6,888,943 B1 | 5/2005 | Lam et al. |
| 6,931,536 B2 | 8/2005 | Hollar |
| 7,024,018 B2 | 4/2006 | Petrovic |
| 7,140,043 B2 | 11/2006 | Choi et al. |
| 7,159,118 B2 | 1/2007 | Petrovic |
| 7,224,819 B2 | 5/2007 | Levy et al. |
| 7,460,667 B2 | 12/2008 | Lee et al. |
| 7,533,266 B2 | 5/2009 | Bruekers et al. |
| 7,707,422 B2 | 4/2010 | Shin et al. |
| 7,779,271 B2 | 8/2010 | Langelaar |
| 7,983,922 B2 | 7/2011 | Neusinger et al. |
| 7,986,806 B2 | 7/2011 | Rhoads |
| 7,991,995 B2 | 8/2011 | Rabin et al. |
| 8,015,410 B2 | 9/2011 | Pelly et al. |
| 8,055,013 B2 | 11/2011 | Levy et al. |
| 8,059,815 B2 | 11/2011 | Lofgren et al. |
| 8,059,858 B2 | 11/2011 | Brundage et al. |
| 8,081,757 B2 | 12/2011 | Voessing et al. |
| 8,085,935 B2 | 12/2011 | Petrovic |
| 8,138,930 B1 | 3/2012 | Heath |
| 8,151,113 B2 | 4/2012 | Rhoads |
| 8,181,262 B2 | 5/2012 | Cooper et al. |
| 8,189,861 B1 | 5/2012 | Rucklidge |
| 8,194,803 B2 | 6/2012 | Baum et al. |
| 8,249,992 B2 | 8/2012 | Harkness et al. |
| 8,259,873 B2 | 9/2012 | Baum et al. |
| 8,280,103 B2 | 10/2012 | Petrovic et al. |
| 8,301,893 B2 | 10/2012 | Brundage |
| 8,315,835 B2 | 11/2012 | Tian et al. |
| 8,321,679 B2 | 11/2012 | Petrovic et al. |
| 8,340,348 B2 | 12/2012 | Petrovic et al. |
| 8,346,532 B2 | 1/2013 | Chakra et al. |
| 8,346,567 B2 | 1/2013 | Petrovic et al. |
| 8,467,717 B2 | 6/2013 | Croy et al. |
| 8,479,225 B2 | 7/2013 | Covell et al. |
| 8,483,136 B2 | 7/2013 | Yuk et al. |
| 8,533,481 B2 | 9/2013 | Petrovic et al. |
| 8,538,066 B2 | 9/2013 | Petrovic et al. |
| 8,560,604 B2 | 10/2013 | Shribman et al. |
| 8,588,459 B2 | 11/2013 | Bloom et al. |
| 8,589,969 B2 | 11/2013 | Falcon |
| 8,601,504 B2 | 12/2013 | Stone et al. |
| 8,615,104 B2 | 12/2013 | Petrovic et al. |
| 8,666,528 B2 | 3/2014 | Harkness et al. |
| 8,682,026 B2 | 3/2014 | Petrovic et al. |
| 8,726,304 B2 | 5/2014 | Petrovic et al. |
| 8,745,403 B2 | 6/2014 | Petrovic |
| 8,768,714 B1 | 7/2014 | Blesser |
| 8,781,967 B2 | 7/2014 | Tehranchi et al. |
| 8,791,789 B2 | 7/2014 | Petrovic et al. |
| 8,806,517 B2 | 8/2014 | Petrovic et al. |
| 8,811,655 B2 | 8/2014 | Petrovic et al. |
| 8,825,518 B2 | 9/2014 | Levy |
| 8,838,977 B2 | 9/2014 | Winograd et al. |
| 8,838,978 B2 | 9/2014 | Winograd et al. |
| 8,869,222 B2 | 10/2014 | Winograd et al. |
| 8,898,720 B2 | 11/2014 | Eyer |
| 8,923,548 B2 | 12/2014 | Petrovic et al. |
| 8,959,202 B2 | 2/2015 | Haitsma et al. |
| 8,990,663 B2 | 3/2015 | Liu et al. |
| 9,009,482 B2 | 4/2015 | Winograd |
| 9,042,598 B2 | 5/2015 | Ramaswamy et al. |
| 9,055,239 B2 | 6/2015 | Tehranchi et al. |
| 9,106,964 B2 | 8/2015 | Zhao |
| 9,117,270 B2 | 8/2015 | Wong et al. |
| 9,147,402 B2 | 9/2015 | Chen et al. |
| 9,277,183 B2 | 3/2016 | Eyer |
| 2002/0032864 A1 | 3/2002 | Rhoads et al. |
| 2002/0138695 A1 | 9/2002 | Beardsley et al. |
| 2003/0012403 A1 * | 1/2003 | Rhoads ............ G06F 17/30026 382/100 |
| 2003/0228030 A1 | 12/2003 | Wendt |
| 2004/0039914 A1 | 2/2004 | Barr et al. |
| 2004/0101160 A1 * | 5/2004 | Kunisa ............... G06T 1/0028 382/100 |
| 2004/0250080 A1 * | 12/2004 | Levy ............... G06T 1/0064 713/176 |
| 2005/0182792 A1 | 8/2005 | Israel et al. |
| 2006/0047704 A1 | 3/2006 | Gopalakrishnan |
| 2006/0053292 A1 | 3/2006 | Langelaar |
| 2006/0083242 A1 | 4/2006 | Pulkkinen |
| 2006/0115108 A1 | 6/2006 | Rodriguez et al. |
| 2007/0003103 A1 | 1/2007 | Lemma et al. |
| 2007/0039018 A1 | 2/2007 | Saslow et al. |
| 2007/0250560 A1 | 10/2007 | Wein et al. |
| 2008/0037825 A1 * | 2/2008 | Lofgren ............ G06F 17/30241 382/100 |
| 2008/0297654 A1 | 12/2008 | Verberkt et al. |
| 2008/0301304 A1 | 12/2008 | Chitsaz et al. |
| 2009/0060055 A1 | 3/2009 | Blanchard et al. |
| 2009/0089078 A1 | 4/2009 | Bursey |
| 2009/0158318 A1 | 6/2009 | Levy |
| 2009/0319639 A1 | 12/2009 | Gao et al. |
| 2010/0023489 A1 | 1/2010 | Miyata et al. |
| 2010/0054531 A1 | 3/2010 | Kogure et al. |
| 2010/0063978 A1 | 3/2010 | Lee et al. |
| 2010/0131461 A1 | 5/2010 | Prahlad et al. |
| 2010/0172540 A1 | 7/2010 | Davis et al. |
| 2010/0174608 A1 | 7/2010 | Harkness et al. |
| 2010/0281142 A1 | 11/2010 | Stoyanov |
| 2011/0058188 A1 | 3/2011 | Guo et al. |
| 2011/0088075 A1 | 4/2011 | Eyer |
| 2011/0103444 A1 | 5/2011 | Baum et al. |
| 2011/0161086 A1 * | 6/2011 | Rodriguez ............ G06T 1/0071 704/270 |
| 2011/0164784 A1 * | 7/2011 | Grill .................. G10L 19/018 382/100 |
| 2011/0188700 A1 | 8/2011 | Kim et al. |
| 2011/0261667 A1 | 10/2011 | Ren et al. |
| 2011/0281574 A1 | 11/2011 | Patel et al. |
| 2011/0286625 A1 | 11/2011 | Petrovic et al. |
| 2011/0293090 A1 | 12/2011 | Ayaki et al. |
| 2011/0320627 A1 | 12/2011 | Landow et al. |
| 2012/0023595 A1 | 1/2012 | Speare et al. |
| 2012/0063635 A1 * | 3/2012 | Matsushita ............ G06T 1/0028 382/100 |
| 2012/0072731 A1 | 3/2012 | Winograd et al. |
| 2012/0102304 A1 | 4/2012 | Brave |
| 2012/0113230 A1 | 5/2012 | Jin |
| 2012/0117031 A1 | 5/2012 | Cha et al. |
| 2012/0122429 A1 | 5/2012 | Wood et al. |
| 2012/0129547 A1 | 5/2012 | Andrews, III et al. |
| 2012/0203556 A1 | 8/2012 | Villette et al. |
| 2012/0203734 A1 | 8/2012 | Spivack et al. |
| 2012/0216236 A1 | 8/2012 | Robinson et al. |
| 2012/0265735 A1 | 10/2012 | McMillan et al. |
| 2012/0272012 A1 | 10/2012 | Aronovich et al. |
| 2012/0272327 A1 | 10/2012 | Shin et al. |
| 2012/0300975 A1 | 11/2012 | Chalamala et al. |
| 2012/0304206 A1 | 11/2012 | Roberts et al. |
| 2012/0308071 A1 | 12/2012 | Ramsdell et al. |
| 2013/0007462 A1 | 1/2013 | Petrovic et al. |
| 2013/0024894 A1 | 1/2013 | Eyer |
| 2013/0031579 A1 | 1/2013 | Klappert |
| 2013/0060837 A1 | 3/2013 | Chakraborty et al. |
| 2013/0073065 A1 | 3/2013 | Chen et al. |
| 2013/0114848 A1 | 5/2013 | Petrovic et al. |
| 2013/0117571 A1 | 5/2013 | Petrovic et al. |
| 2013/0129303 A1 | 5/2013 | Lee et al. |

(56) References Cited

U.S. PATENT DOCUMENTS

| | | | |
|---|---|---|---|
| 2013/0151855 A1 | 6/2013 | Petrovic et al. | |
| 2013/0151856 A1* | 6/2013 | Petrovic | H04N 1/00846 |
| | | | 713/176 |
| 2013/0152210 A1 | 6/2013 | Petrovic et al. | |
| 2013/0171926 A1 | 7/2013 | Perret et al. | |
| 2013/0188923 A1* | 7/2013 | Hartley | H04N 9/87 |
| | | | 386/241 |
| 2014/0047475 A1 | 2/2014 | Oh et al. | |
| 2014/0059116 A1* | 2/2014 | Oh | H04L 65/60 |
| | | | 709/203 |
| 2014/0059591 A1 | 2/2014 | Terpstra et al. | |
| 2014/0067950 A1 | 3/2014 | Winograd | |
| 2014/0068686 A1 | 3/2014 | Oh et al. | |
| 2014/0074855 A1 | 3/2014 | Zhao et al. | |
| 2014/0075465 A1 | 3/2014 | Petrovic et al. | |
| 2014/0075469 A1 | 3/2014 | Zhao | |
| 2014/0114456 A1 | 4/2014 | Stavropoulos et al. | |
| 2014/0115644 A1 | 4/2014 | Kim et al. | |
| 2014/0130087 A1 | 5/2014 | Cho et al. | |
| 2014/0142958 A1 | 5/2014 | Sharma et al. | |
| 2014/0149395 A1* | 5/2014 | Nakamura | G06F 21/16 |
| | | | 707/722 |
| 2014/0196071 A1 | 7/2014 | Terpstra et al. | |
| 2014/0219495 A1* | 8/2014 | Hua | G06T 1/0021 |
| | | | 382/100 |
| 2014/0267907 A1 | 9/2014 | Downes et al. | |
| 2014/0270337 A1 | 9/2014 | Zhao et al. | |
| 2014/0279549 A1 | 9/2014 | Petrovic et al. | |
| 2014/0325550 A1 | 10/2014 | Winograd et al. | |
| 2014/0325673 A1 | 10/2014 | Petrovic | |
| 2015/0030200 A1 | 1/2015 | Petrovic et al. | |
| 2015/0043728 A1 | 2/2015 | Kim et al. | |
| 2015/0043768 A1 | 2/2015 | Breebaart | |
| 2015/0063659 A1* | 3/2015 | Poder | G06T 1/0021 |
| | | | 382/118 |
| 2015/0093016 A1* | 4/2015 | Jiang | G06T 1/0028 |
| | | | 382/154 |
| 2015/0121534 A1 | 4/2015 | Zhao et al. | |
| 2015/0170661 A1 | 6/2015 | Srinivasan | |
| 2015/0229979 A1 | 8/2015 | Wood et al. | |
| 2015/0261753 A1 | 9/2015 | Winograd et al. | |
| 2015/0264429 A1 | 9/2015 | Winograd et al. | |
| 2015/0324947 A1 | 11/2015 | Winograd et al. | |
| 2015/0340045 A1 | 11/2015 | Hardwick et al. | |
| 2016/0055606 A1 | 2/2016 | Petrovic et al. | |
| 2016/0055607 A1 | 2/2016 | Petrovic et al. | |
| 2016/0057317 A1 | 2/2016 | Zhao et al. | |
| 2016/0148334 A1 | 5/2016 | Petrovic et al. | |
| 2016/0182973 A1 | 6/2016 | Winograd et al. | |
| 2016/0241932 A1 | 8/2016 | Winograd et al. | |

FOREIGN PATENT DOCUMENTS

| | | |
|---|---|---|
| EP | 2489181 A2 | 8/2012 |
| EP | 2899720 A1 | 7/2015 |
| JP | 2004163855 | 6/2004 |
| JP | 2004173237 | 6/2004 |
| JP | 2004193843 | 7/2004 |
| JP | 2004194233 | 7/2004 |
| JP | 2004328747 | 11/2004 |
| JP | 2005051733 | 2/2005 |
| JP | 2005094107 | 4/2005 |
| JP | 2005525600 | 8/2005 |
| JP | 20100272920 | 12/2010 |
| KR | 1020080087047 | 9/2008 |
| KR | 20100009384 | 1/2010 |
| KR | 10201016712 | 2/2011 |
| KR | 20120083903 A | 7/2012 |
| KR | 1020120128149 | 11/2012 |
| KR | 20130074922 A | 7/2013 |
| KR | 20130078663 A | 7/2013 |
| KR | 101352917 B1 | 1/2014 |
| KR | 10201424049 | 7/2014 |
| WO | 0059148 A1 | 10/2000 |
| WO | 2005017827 | 2/2005 |
| WO | 2005038778 | 4/2005 |
| WO | 2006051043 | 5/2006 |
| WO | 2009031082 | 3/2009 |
| WO | 2010073236 | 7/2010 |
| WO | 2010135687 | 11/2010 |
| WO | 2011046590 A2 | 4/2011 |
| WO | 2011116309 | 9/2011 |
| WO | 2012177126 A1 | 12/2012 |
| WO | 2012177874 A2 | 12/2012 |
| WO | 2013025035 A2 | 2/2013 |
| WO | 2013163921 | 11/2013 |
| WO | 2015138798 | 9/2015 |
| WO | 2015168697 | 11/2015 |
| WO | 2015174086 | 11/2015 |
| WO | 2016028934 | 2/2016 |
| WO | 2016028936 | 2/2016 |
| WO | 2016029055 | 2/2016 |
| WO | 2016086047 A1 | 6/2016 |

OTHER PUBLICATIONS

International Search Report and Written Opinion dated Apr. 12, 2016 for International Application No. PCT/US2015/066872, filed Dec. 18, 2015 (7 pages).

Office Action dated Jun. 10, 2016 for Korean Patent Application No. 10-2016-7002291 (19 pages).

Office Action dated Jul. 28, 2016 for Korean Patent Application No. 10-2016-7002289 (11 pages).

Office action dated Nov. 30, 2016 for Korean Patent Application No. 10-2016-7002289 (4 pages).

"ATSC-3.0 Automatic Content Recognition Watermarking Solutions," ATSC Technology Group, Advanced Television Systems Committee, Inc., Jan. 2014 (6 pages).

Aris Technologies, Inc. "Audio Watermarking System to Screen Digital Audio Content for LCM Acceptance," VLAY 1999 (17 pages).

Bangaleea, R., et al., "Performance improvement of spread spectrum spatial-domain watermarking scheme through diversity and attack characterisation," IEEE Africon, pp. 293-298, 2002.

Hartung, F., et al., "Watermarking of MPEG-2 encoded video without decoding and re-coding," Proc. SPIE Multimedia Computing and Networking 97, 3020:264-274, Feb. 1997.

Hartung, F., et al., "Watermarking of uncompressed and compressed video," Signal Processing, 3(66):283-301, May 1998.

International Search Report and Written Opinion dated Aug. 13, 2015 for International Application No. PCT/US2015/029097, filed May 4, 2015 (14 pages).

International Search Report and Written Opinion dated Dec. 7, 2015 for International Application No. PCT/US2015/045960, filed Aug. 19, 2015 (14 pages).

International Search Report and Written Opinion dated Jan. 28, 2016 for International Application No. PCT/US2015/045964, filed Aug. 19, 2015 (8 pages).

International Search Report and Written Opinion dated May 28, 2015 for International Application No. PCT/US2015/020282, filed Mar. 12, 2015 (7 pages).

Kalker, T., et al., "System issues in digital image and video watermarking for copy protection," Proc. IEEE Int. Conf. on Multimedia Computing and Systems, pp. 562-567, Jun. 1999.

Kirovski, D., et al., "Multimedia content screening using a dual watermarking and fingerprinting system," Proceedings of the tenth ACM international conference, pp. 372-381, 2002.

Kirovski, D., et al., "Multimedia content screening using a dual watermarking and fingerprinting system," Multimedia '02 Proceedings of the tenth ACM international conference on Multimedia, 2002 (11 pages).

Verance Corporation, "Confirmedia," PowerPoint presentation made to National Association of Broadcasters, Apr. 24, 2001 (40 pages).

Zhao, J., "A WWW service to embed and prove digital copyright watermarks," Proc. European Conf. on Multimedia Applications, Services and Techniques (ECMAST'96), May 1996 (15 pages).

Zhao, J., "Applying digital watermarking techniques to online

(56) References Cited

OTHER PUBLICATIONS multimedia commerce," Proc. Int. Conf. on Imaging Science, Systems and Applications (CISSA'97), Jun./Jul. 1997 (7 pages).
International Search Report and Written Opinion dated Mar. 15, 2016 for International Application No. PCT/US2015/062514, filed Nov. 24, 2015 (10 pages).
Furon, T., "A constructive and unifying framework for zero-bit watermarking," CS.MM, Jan. 12, 2007.

* cited by examiner

ENHANCED METADATA AND CONTENT DELIVERY USING WATERMARKS

CROSS REFERENCE TO RELATED APPLICATIONS

This application claims the benefit of priority of U.S. Provisional Patent Application No. 62/084,465, filed Nov. 25, 2014, the entire contents of which are incorporated by reference as part of the disclosure of this document.

TECHNICAL FIELD

The subject matter of this patent document relates to management of multimedia content and more specifically to facilitate access and delivery of metadata, programs and services associated with a multimedia content based on watermarking techniques.

BACKGROUND

The use and presentation of multimedia content on a variety of mobile and fixed platforms have rapidly proliferated. By taking advantage of storage paradigms, such as cloud-based storage infrastructures, reduced form factor of media players, and high-speed wireless network capabilities, users can readily access and consume multimedia content regardless of the physical location of the users or the multimedia content. A multimedia content, such as an audiovisual content, can include a series of related images, which, when shown in succession, impart an impression of motion, together with accompanying sounds, if any. Such a content can be accessed from various sources including local storage such as hard drives or optical disks, remote storage such as Internet sites or cable/satellite distribution servers, over-the-air broadcast channels, etc.

In some scenarios, such a multimedia content, or portions thereof, may contain only one type of content, including, but not limited to, a still image, a video sequence and an audio clip, while in other scenarios, the multimedia content, or portions thereof, may contain two or more types of content such as audiovisual content and a wide range of metadata. The metadata can, for example include one or more of the following: channel identification, program identification, content and content segment identification, content size, the date at which the content was produced or edited, identification information regarding the owner and producer of the content, timecode identification, copyright information, closed captions, and locations such as URLs where advertising content, software applications, interactive services content, and signaling that enables various services, and other relevant data that can be accessed. In general, metadata is the information about the content essence (e.g., audio and/or video content) and associated services (e.g., interactive services, targeted advertising insertion).

Such metadata is often interleaved, prepended or appended to a multimedia content, which occupies additional bandwidth, can be lost when content is transformed into a different format (such as digital to analog conversion, transcoded into a different file format, etc.), processed (such as transcoding), and/or transmitted through a communication protocol/interface (such as HDMI, adaptive streaming). Notably, in some scenarios, an intervening device such as a set-top box issued by a multichannel video program distributor (MVPD) receives a multimedia content from a content source and provides the uncompressed multimedia content to a television set or another presentation device, which can result in the loss of various metadata and functionalities such as interactive applications that would otherwise accompany the multimedia content. Therefore alternative techniques for content identification can complement or replace metadata multiplexing techniques.

SUMMARY OF CERTAIN EMBODIMENTS

Figure 1:
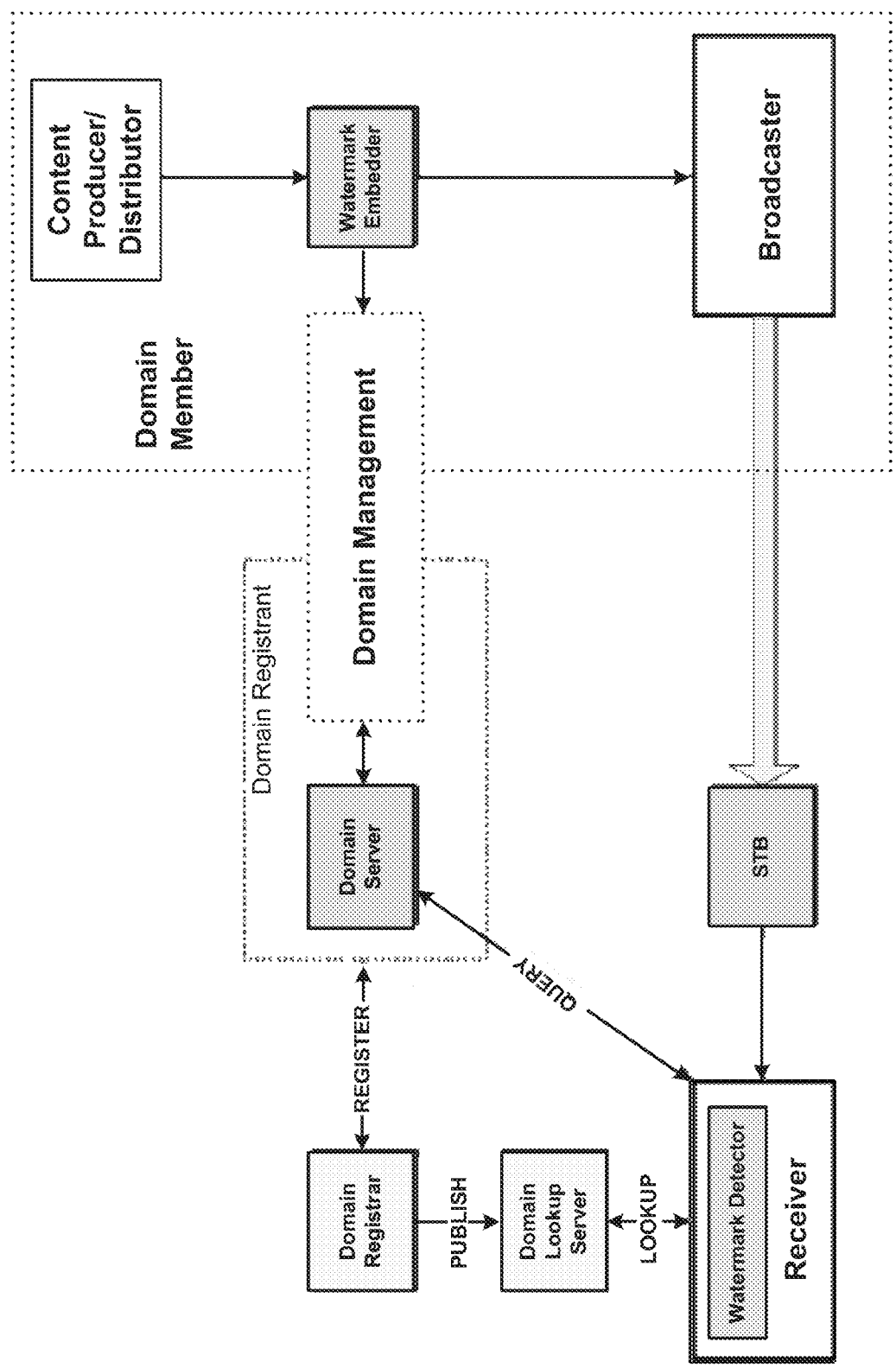
FIG. 1 illustrates a system for providing automatic content recognition and acquisition of interactive content in accordance with an exemplary embodiment.

The disclosed technology relates to methods, devices, systems and computer program products that utilize watermark embedding and/or extraction techniques to facilitate access and delivery of metadata, programs and services that are associated with a multimedia content.

One aspect of the disclosed technology relates to a device associated with a content distributor for enabling delivery of metadata associated with a primary content to a client device. The device includes a processor and a memory including processor executable code. The processor executable code, upon execution by the processor, causes the device to receive the primary content that includes one or more pre-existing watermark messages embedded therein. The one or more pre-existing watermark messages include a server code field and an interval code field that indicate availability of a first metadata associated with the primary content. The processor executable code, upon execution by the processor, also causes the device to obtain a first server code value and a first interval code value associated with the one or more pre-existing watermark messages, and obtain boundary locations of a plurality of symbols of the one or more pre-existing watermark messages in the primary content.

The processor executable code, upon execution by the processor, additionally causes the device to embed one or more symbols of a new watermark message in the primary content such that boundary locations of the one or more symbols of the new watermark message coincide with boundary locations of one or more symbols of the one or more pre-existing watermark messages. The new watermark message includes a server code field and an interval code field that indicate availability of a second metadata associated with the primary content. The processor executable code, upon execution by the processor, also causes the device to transmit information associated with the new watermark message to a server device associated with the content distributor, where the transmitted information including timing information associated with the new watermark message, and to transmit the primary content to the client device to enable access to the first or the second metadata at the client device upon recovery of the new watermark message.

The first or the second metadata can enable presentation of a first program or service, or a second program of service, respectively, at the client device. Such programs or services can be one of an advertisement, a targeted advertisement, an interactive program, or a secondary video content. In some embodiments, the above noted embedding of the one or more symbols of a new watermark message overwrites fewer than all symbols of a first pre-existing watermark message, and renders the first pre-existing watermark message undetectable upon a subsequent attempt to extract the first pre-existing watermark message from the primary content.

DETAILED DESCRIPTION

In the following description, for purposes of explanation and not limitation, details and descriptions are set forth in order to provide a thorough understanding of the disclosed embodiments. However, it will be apparent to those skilled in the art that the present invention may be practiced in other embodiments that depart from these details and descriptions.

Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

To mitigate the issues that can arise from the loss of content metadata that are carried in separate metadata channels is to embed watermarks into the content to enable automatic content recognition (ACR) and metadata recovery. Watermarks can be embedded in the audio and/or video portions of a content and are substantially imperceptible to a viewer (or listener) of the content. Properly designed watermarks can be immune to various content processing operations and channel impairments, such as compression and decompression, cropping, scaling, transcoding, format conversion, noise addition, acoustic propagation, optical (e.g., free space) transmission, digital-to-analog (D/A) and analog-to-digital (A/D) conversions and the like.

Once the embedded watermarks are detected by a watermark detector (also sometimes referred to as a watermark extractor), the payload of the watermark can be used to identify the content and recover the metadata associated with the identified content. In ACR applications, watermarks are often designed with a set of requirements that differ from requirements that are imposed on other watermark detectors, such as copy control watermark detectors. For example, in ACR applications it is critical to be able to recognize a content very quickly. After a content is recognized, the associated metadata can be recovered to enable various operations, such as receiving an additional content, performing dynamic advertising insertion, or participating in an interactive opportunity. Further, the viewing device (or an associated device) can be connected to the Internet (or more generally, to a remote database) for the retrieval of the additional content, for participating in the interactive opportunities or other services.

FIG. 1 illustrates a system for providing automatic content recognition for content that is provided by a broadcaster or redistributor to a consumer device and acquisition of interactive content that can be used for accommodating the disclosed embodiments. The system of FIG. 1 is one example of an ecosystem that can accommodate, and benefit from, the disclosed watermark detection techniques. The system of FIG. 1 is compatible with the requirements of the Advanced Television Systems Committee (ATSC), Inc., Call for Proposals For ATSC-3.0 AUTOMATIC CONTENT RECOGNITION WATERMARKING SOLUTIONS— ATSC Technology Group 3 (ATSC 3.0) (S33 Doc. 067r3). It is understood, however, that the use of the system in FIG. 1 is not strictly limited to ATSC technologies, and such a system can enable access to a metadata associated with a content for non-ATSC technologies, as well.

In FIG. 1, the content is embedded with watermarks by a Domain Member prior to broadcast. For example, such a Domain Member can be a content producer or a Broadcaster. A Broadcaster (which can also be called a Redistributor) transmits the content to one or more user premises. Such content is often received at a receiver such as a set top box (STB), where decompression and formatting operations may take place before the content is provided (typically via a HDMI interface) to a viewing device (sometimes referred to as the "Receiver" or the "Receiver Device"). Such a Receiver can be compliant with the ATSC 3.0 standard. Decompression and formatting may alternatively take place within the Receiver. The Receiver which includes a watermark detector, examines the received content for the presence of watermarks. The detection of watermarks may trigger further actions such as identifying a domain name associated with the detected watermark payload and sending a query to an identified domain server. Such a Receiver can operate as a client device which is communicatively connected to one or more servers and/or other client devices.

It should be noted that while in some implementations, the Receiver is a separate component than the set-top box, in other implementations the Receiver may include, or be part of a larger device that includes, any one or combinations of additional components such as a set-top box, a display, keyboard or other user interface devices, or a watermark detector, as well as processors (e.g., microprocessors, digital signal processors (DSPs), etc.) and other circuitry that may be needed for implementation of such device, or devices.

The watermark structure in some exemplary embodiments includes the following fields: a Domain ID and a Sequence ID. Each Domain ID is assigned by a central authority to a Domain Registrant who controls assignment and use of the Sequence ID codes under that domain. Each Domain ID maps one-to-one to an Internet domain name which is used to retrieve metadata associated with Sequence IDs in that domain. The Domain Registrar in FIG. 1 is a unique centralized entity responsible for registering such Domain IDs and publishing the mapping between the Domain IDs and domain names to Domain Lookup Servers. Domain registration is a process wherein a Domain ID is uniquely assigned to a Domain Registrant entity. The Domain Registrar provides Domain Registrant with a process (e.g., designated as REGISTER in FIG. 1) to establish and maintain the relationship between the Domain ID and a domain name (e.g., Internet format). Multiple Domain IDs may be mapped to the same domain name. The Domain Registrar further maintains a database of all mappings from Domain IDs to domain names. The Domain Registrar employs a standardized protocol (e.g., designated as PUBLISH in FIG. 1) to publish new and modified domain mappings to Domain Lookup Services that can include Domain Lookup Servers, as well as any other devices that may be needed to implement Domain Lookup Services. This protocol used by the Domain Registrar enables interoperability between the central Domain Registrar and all Domain lookup services. In some implementations, support for PUBLISH protocol is mandatory on both the Domain Lookup Servers and the Domain Registrar.

Domain Lookup Server(s) maintain a copy of the Domain Registration database which maps each registered Domain ID to a domain name and keeps it current using the PUBLISH protocol with the Domain Registrar. Domain Lookup Server(s) also employ a standardized protocol (e.g., designated as LOOKUP in FIG. 1) to provide domain name mappings from the database in response to Domain ID lookup queries originated by the Receivers. The use of a standardized LOOKUP protocol allows interoperability between any Receiver and any Domain Lookup Server. In some embodiments the Receivers are ATSC-compatible or ATSC-complaint. That is, those receivers comply with ATSC requirements, such as those under ATSC 3.0.

Domain Servers can be Internet servers that are accessible at the domain name associated with a registered Domain ID and can provide metadata to Receivers in response to queries triggered by watermark detections. In some implementations, queries employ a standardized message protocol (e.g., designated as QUERY in FIG. 1). A query is initiated by a Receiver and provides the domain server with a Domain ID and Sequence ID. The Domain Server responds with available metadata (e.g. broadcast channel identifier, a broadcast segment identifier, a timecode, a signaling) associated with the provided Domain ID and Sequence ID. Domain servers are not required to provide data for all required data fields available for all queries. In some embodiments, support for the QUERY protocol is mandatory on all Receivers and Domain Servers in order to enable interoperability among all receivers and content. This protocol enables interoperability between all receivers and all domain servers and support may be mandatory on both the receivers and the domain servers.

In one example implementation, a 50-bit payload can be embedded in every 1.5 seconds of the content. In this example, the watermark payload can be standardized with the following structure: [Payload Type:2][Payload:48]. That is, the right-most 48 bits are designated to carry the payload and the 2 left-most bits are designated to carry the Payload Type. For example, the Payload Type values can be in the range 0 to 3, where a "0" designates a Reserved payload type, a "1" designate a Large Domain payload type, a "2" designates a Medium Domain payload type, and a "3" designates a Small Domain payload type. The payload type values can thus each describe the structure of the payload.

The Domain field from any structure can be mapped into a unique Domain ID by prepending the Payload Type value to the Domain field and zero-padding (on the right) to 32 bits. For ASCII encoding, the Domain ID can be represented as an 8-character hexadecimal value. Domain field value of 0 can be reserved in all domains. The Sequence field from any structure can be mapped directly into a Sequence ID. For ASCII encoding, hexadecimal representation of the Sequence field (leading zeroes optional) can be utilized. Sequence IDs with decimal value of 1024 or less can be reserved for use as Control Codes. Control Codes are currently reserved.

The trigger bit, when set (e.g. to a value of "1"), can inform the Receiver of an event that may activate the Receiver to perform various operations such as requesting metadata from the domain server. It can indicate that further services or features, such as interactive content or advertising insertion associated with the Sequence ID is available to the Receiver from the domain server associated with the payload's Domain ID. In some implementations the trigger field can include multiple bits.

The watermark payload can undergo various coding, modulation and formatting operations before being embedded into a content. For example, the payload may be error correction code (ECC) encoded, scrambled, interleaved with other packets, appended with a synchronization or registration header, encrypted or channel coded to form a sequence of bits with particular characteristics. Once embedded into a host content, the embedded host content can be processed by a watermark extractor to recover the embedded watermark bits (or, more generally, symbols), and perform the reverse of the above coding, modulation or formatting schemes to recover the payload. In some instances, statistical techniques are used to recover the embedded symbols from the content using multiple instances of embedded watermarks.

Figure 2:
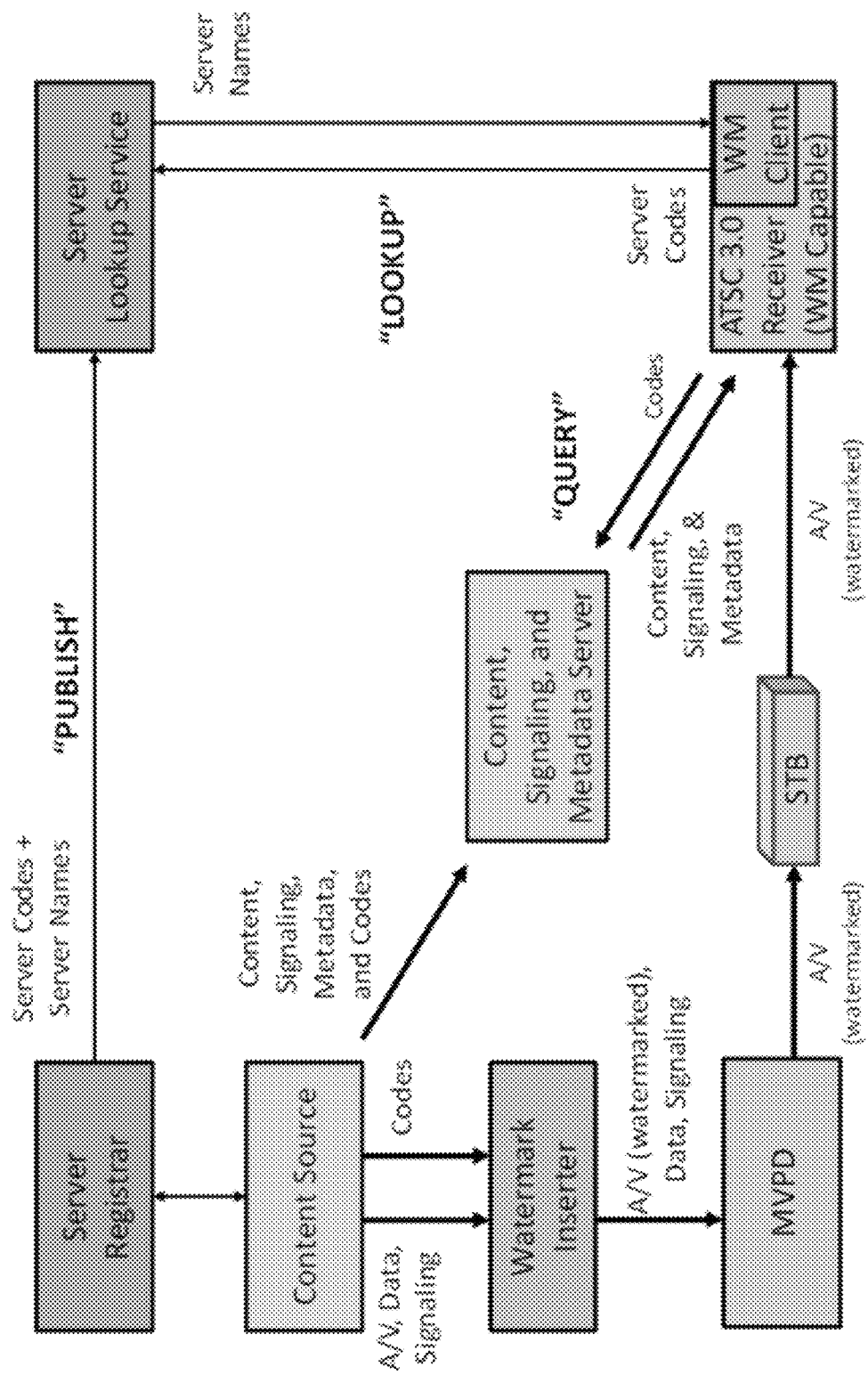
FIG. 2 illustrates another system and associated components that enables automatic content recognition and acquisition of corresponding metadata in accordance with an exemplary embodiment.

FIG. 2 provides another exemplary system that can accommodate, and benefit from, the disclosed embodiments, while conforming to ACR requirements of ATSC 3.0. It is understood, however, that the use of the system in FIG. 1 is not strictly limited to ATSC technologies, and such a system can enable access to a metadata associated with a content for non-ATSC technologies, as well. Several components that are shown in FIG. 2 can find analogous counterparts in FIG. 1. For example, the Server Registrar and the Domain Registrar; the Content, Signaling and Metadata Server and Domain Server; and the Server Lookup Service/server and Domain Lookup Server can carry out analogous operations. The various components in FIG. 2 are further described below. A Server Registrar is established by ATSC for the purpose of registering ATSC Domains and assigning to each a unique Server Code. Registrants inform the registrar of a Server Name, which is the Internet domain name or URL at which metadata services associated with the Code Domain are located. The Server Registrar publishes the Server Code and associated Server Name to the Server Lookup Services.

One or more Server Lookup Services are established. These services may be operated by ATSC, the Server Registrar, Content Owners, ATSC Receiver manufacturers, or a third party. Each Server Lookup Service maintains a database of all Server Code/Server Name associations published by the Server Registrar and responds to lookup requests from ATSC Receivers. The Server Lookup Services do not need to access or store any broadcast metadata; they simply provide ATSC Receivers with access to Server Names associated with Server Codes detected from broadcast watermarks.

A Content Source, acting either as a Server Registrant or in concert with a Server Registrant, associates a valid registered Server Code and one or more unique Interval Codes and maps them to intervals of broadcast content essence. The Content Source embeds those codes in the broadcast content using a Watermark Inserter prior to delivery of the broadcast content to an MVPD. The Sever Code can be analogous to the Sequence ID described in the exemplary watermark payload above.

The Interval Codes and the metadata for those same intervals of broadcast essence (e.g. any interactive content, signaling, metadata, triggers, channel identifier, media timeline timecode, etc.) are associated together in a database which is provided to a Content, Signaling, and Metadata Server ("CSM Server"). Content Sources may associate and embed watermarks continuously throughout their program material using sequentially increasing Interval Codes (e.g., analogous the Sequence ID described in the exemplary watermark payload above), may embed watermarks only in those intervals of content where interactive services are enabled, or may embed an Interval Code repeatedly through a program segment where an interactive service is available but does not require timing precision. Content Sources may register additional Code Domains in advance of depleting the Interval Code space associated with a given Server Code and may associate newly assigned Server Codes with the same Internet domain name to maintain infrastructure continuity.

The CSM Server responds to various requests from ATSC Receivers, including delivery of signaling and interactive content based on interactive service data received from a complete broadcast stream. The CSM Server also responds to code metadata queries, in which a query containing the watermark payload (e.g. in the ASCII representational format) is submitted by the WM Client in an ATSC Receiver, with a request for metadata associated with the interval of broadcast content. The metadata included in the CSM Server response may include channel identifiers, timecodes, content or segment identifiers, triggers, etc. It should be noted that while metadata services can be hosted in the same servers as the content and signaling services, they may alternatively be hosted on different servers from those used for content and signaling services.

To enable the architecture that is depicted in FIG. 2, open standards can be provided for the following three network protocols: PUBLISH, LOOKUP, and QUERY.

PUBLISH is a protocol whereby the Server Registrar notifies interested ecosystem participants of a newly established or updated mapping between a Server Code and an Internet domain name and publishes the association to Server Lookup Services.

LOOKUP is a protocol whereby an ATSC Receiver can submit a Server Code to a Server Lookup Service and receive a response containing the associated Server Name which has been most recently published by the Server Registrar.

QUERY is a protocol whereby an ATSC Receiver can submit a Server Code and Interval Code to a CSM Server and receive ATSC metadata (e.g. channel, timecode, interactive services triggers, etc.) associated with the specified interval of broadcast content.

The systems of FIGS. 1 and 2 thus, through the use of watermarks, enable advanced presentation features when reliable metadata about the content, timing, and desired presentation features is not delivered to the client device with the content.

One use case for such watermarks is to provide interactive applications that enhance audio/video experience of viewers. In this scenario, the receiver uses information that it obtains from the extracted watermarks to access a web based server and to download secondary content, which can be used to enhance the primary content; such a secondary content is typically presented in synchronization with the primary content. The secondary content can be also created simultaneously with the first content, and linking them through watermarks may be done by the content producers. The secondary content can include T-commerce, director's commentary, character background, alternate language tracks, statistics of athletes in a sport event, etc.

Another use case for the disclosed technology can be the insertion or replacement of interstitial content such as advertisements and promotions which are not the same for all viewers. Such advertisement and promotions may be selected based on various factors such as known viewer preferences, viewer location (which may be determined based on the viewer's IP address), the time at which content is being viewed, or other factors. These are generally referred to as "targeted ads." Typically targeted ads are performed under the control of a content distributor that uses the embedded watermarks to carry information that is obtained by the client device to recover insertion instructions. Further use cases include audience measurement, rights administration, proof of performance, etc.

In view of many use cases it is reasonable to expect situations where there is a need to change preexisting information stored in the watermarks. In some cases there is even a need to erase information stored in watermarks. For example, a distributor may want to redistribute a content which has been recorded from another distributor, but may want to avoid triggering the original distributor's watermark-enabled feature in the retransmission. Or, a distributor may want to replace watermarks which are carried in a content that is being retransmitted in order to augment or modify the behavior of devices which receive the content.

Furthermore, the watermarks may need to be embedded in live and/or in pre-recorded content. In the case of live content, it is typically not known in advance when the interactivity is going to be needed, or when the opportunity for ad insertion will arise. Thus it is desirable to send a signal, e.g., a trigger flag, to inform the receiver that it needs to contact web server to get new information. In a more general case, the trigger flag provides a signal to the receiver that a predefined action needs to take place. For example, a trigger flag can signal to the receiver to halt any modification of audio and video in the primary content. Such a flag may be useful when the primary audiovisual content introduces an emergency alert that should not be disturbed.

Examples Overwriting, Erasure or Layering Considerations:

As noted earlier, the trigger field, when set (e.g. to a value of "1") indicates that further services or features, such as interactive content or advertising insertion associated with the content, can be accessible to the receiver. In some implementations, the trigger field may be used for other purposes. For example, a field can be defined as an "over-writeable" bit which indicates whether or not a preexisting watermark previously embedded by a content distributor or content producer can be replaced by another distributor (this is sometimes referred to as watermark "replacing"). In this case, a watermark embedder first checks for the presence of a watermark payload, and verifies the value of such 'over-writeable' bit if a payload is preset, and decides if a new watermark payload can be embedded to replace the pre-existing one according to the value of the bit.

In another example, another field can be defined as an "over-watermarkable" bit which indicates whether or not a new watermark payload can be embedded in the content to co-exists with a pre-existing one so that both can be extracted (this is sometimes referred to as watermark "layering"). In some implementations, additional fields may be added into the watermark payload structure to support these two exemplary use cases. Because the "overwritable" bit and/or "over-watermarkable" bit is associated with a content segment identified by a Sequence ID, each segment of a content may set these bits differently; thus, allowing some segments to be overwritable and/or over-watermarkable.

In another embodiment, authorization of overwriting watermarks or over-watermarking can be performed via a domain server. Such authorization may be associated with one or more Domain IDs and/or Sequence IDs. When a watermark embedder detects a pre-existing watermark payload in a content, it sends the payload to a domain server according to the Domain ID of the payload, and receives a response indicating whether such payload can be replaced by a new payload or a new payload can be layered on top of the pre-existing one.

In some cases, a content distributor may want to check the services enabled by the pre-existing watermark payload before making a decision to replace the pre-existing payloads or layer new payloads in some or all content segments. The distributor can query the domain servers identified by the pre-existing payload for all relevant metadata identifying the services, inspect it, select metadata associated with some content segments, and post the selected metadata to the domain servers preferred by such distributor. The distributor can introduce new services associated with the pre-existing payloads. Alternatively, the distributor can also embed new payloads into some segments and associate new services with these segments enabled by the new payloads on the domain server. Furthermore, it is also possible for the distributor to embed new payloads in some segments on top of pre-existing payloads. Thus, both new payloads and pre-existing payloads can be detected and provided to a domain server, a receiver may receive multiple triggers identified by the new payload or the pre-existing payload associated with a segment. The receiver may choose the services caused by one of the triggers according to user preference or pre-configuration, or bring all services caused by multiple triggers to the user.

One of the services caused by triggers may be presentation of a secondary audiovisual content, typically delivered via Internet, such as pre-fetched advertisements. Such audiovisual content is treated as regular audiovisual content, i.e., it can also be watermarked and watermark-based triggers can be registered with a domain server. Thus, the watermark payloads in the secondary content can also trigger interactive services. This is sometimes called "nested triggers".

In an alternative embodiment, the watermark embedder always overwrites existing watermarks, but keeps track of preexisting watermarks, and their relationship to newly embedded watermarks, and informs the domain server about it. This is particularly useful for live broadcasts, where examining the content for preexisting watermarks can go in parallel with watermark embedding/overwriting without causing any latency in the overwriting process. For example, the domain server can be informed that, at the moment when the embedding of watermark with payload X has begun, a preexisting watermark with payload Y has been found, and the preexisting watermark begins T milliseconds before the newly embedded watermark. With this information, the domain server can later, when queried with payload X, calculate the timeline of preexisting watermarks, and provide the metadata about services in synchronization with timeline of the payload Y.

From a practical point of view, since watermark embedding can be done at various points in the content distribution chain, it is reasonable to expect that, in some instances, the content at the input of a distributor's embedder is already marked with the same type of watermarks as those deployed by the distributor's embedder, and thus overwriting those watermarks can erase or damage the existing watermarks. As also noted above, one approach is to detect the preexisting watermarks in the content at the distributor's embedder input prior to, or in parallel with, embedding of the received content. Once preexisting watermarks are detected, the embedder may be configured to either overwrite the preexisting watermarks or to use an alternate set of watermarking parameters which would allow new information to be embedded while preserving the old information. This is typically referred to as watermark layering.

In certain scenarios, such as targeted advertisement insertion, a distributor may want to remove previously prepared targeted ads, and, for example, enable the distributor's own targeted ads to be presented to the client device. In this case, the distributor can simply overwrite the preexisting watermark with his own, and provide the necessary software application(s) and web server(s) to deliver new targeted ads. For effective overwriting, it is desirable for the watermark embedder to acquire precise information about preexisting watermarks to perform embedding while achieving complete removal of preexisting watermarks with minimal impact on content quality. In this case, it the detector provides to the embedder precise information of preexisting watermark locations including the approximate location of symbol boundaries (e.g., time or spatial locations of symbol boundaries). Moreover, without such a precise knowledge of symbol boundaries, random embedding of watermark symbols into the primary content may not fully remove the pre-existing watermarks, which may still be detected either fully or intermittently from the primary content.

As noted earlier, in some scenarios, a distributor may want to preserve the delivery of some or all of the information referenced by preexisting watermarks, while also having additional information sent to the receiver. For example, a local television station may want to present targeted ads which are selected based on the geographic location of the viewers alongside interactive content prepared by a broadcast network. In this case, the devices associated with the broadcast network embed watermarks in the network content which identify the broadcast and its timeline, and identify a metadata server from which client devices can obtain the associated interactive service information. The local station can retransmit the content, while overwriting the broadcast network's watermarks with the local station's own watermarks (which direct client devices to the local station's metadata servers), while detecting and recording the embedded information and its timing within the watermark embedded by the network. In this scenario, the local station can use the detected watermark information in one of two alternate ways.

In the first alternative, the local station may retrieve the interactive service information from the broadcast network server identified by the broadcast network's watermark. The local station may then store this recovered information on its own metadata servers, and provide it (along with its own targeted ad instructions) directly to client devices that contact those servers in response to detecting the local station's watermarks. As described earlier, in this case, it may be necessary to perform a translation between the timing information associated with the local station's watermark and the timing information associated with the broadcast network's watermark.

As the broadcast network may update the event description (e.g., interactive service or ad insertion information) after the retrieval by the local station, the local station may need to update the event description in the local station's metadata server by retrieving such information from the network periodically or at real-time. For example, the network may enable different interactive activities for live content and time-shifted content (i.e., a content that is recorded earlier and viewed at a later point in time). In such a case, the local station can retrieve the event description from the broadcast network upon receiving the first instance of a trigger associated with network's events, and retrieve the event description again after a period of time (e.g., a few hours) for time-shifted users. Alternatively, whenever the network updates the metadata associated with the network's watermark, the network may push the update to local stations via a communication channel (e.g., via broadband using Internet push technologies), or broadcast the update as an in-stream broadcast message (e.g., via satellite). The local station can deliver the metadata from the network's metadata server and local station's metadata server to the client together or separately.

In the second alternative, the local station may store the watermark information which was overwritten (as well as the associated timing in relation to the local station's watermark) on its metadata servers and provide it (along with local station's own targeted ad instructions) to client devices. The client devices then contact those servers in response to detecting the local station's watermarks. Having received the broadcast network's watermark information from the local station's metadata server, the client device may then contact the broadcast network metadata server indicated therein to obtain the broadcast network's interactive service information.

The two alternatives discussed above for recovering the network's watermarks and associated metadata may co-exist and be implemented in the client devices. The client device may use the type of trigger implementation (to be discussed below) to identify which alternative is used for recovery of the network's watermark and associated metadata.

When the local station overwrites the broadcast network's watermarks, some triggers in the network's watermark may need to be re-embedded in local station's watermark if interactive feature or ad insertion events associated with such triggers enabled by the network take place at different times from the events associated the triggers in local station's watermarks and described by the local station's metadata. In this case, the timing information associated with re-embedded trigger may require a translation between the timelines.

The processes described above can be repeated multiple times, recursively, to enable multiple passes of overwriting to be applied to the content, while enabling client devices to recover the metadata associated with the last watermark as well as all overwritten watermarks.

It should be noted that the terms "broadcast networks" and "local stations" are used for illustrative purposes in describing the above scenarios. It is understood that the above procedures and systems are applicable to other scenarios where a content passes through multiple entities in its distribution, any number of which may modify, augment, monitor, or control presentation of the content to viewers. For example, preservation, replacement or augmentation of original metadata associated with a content can be carried out for syndicated television program segments carried by television broadcast networks, local stations, cable networks distributed by pay TV providers who may want to enable proprietary interactive interfaces, user-generated content distributed by online video services who may want to monetize the content with their own targeted ads, streaming video content hosted for distribution by Content Delivery Networks (CDNs) who may want to redirect client devices to their own metadata servers, or other types of entities in content distribution chain.

In certain aspects of the disclosed embodiments, a method for overwriting a watermark includes receiving content from a first content distributor at a second content distributor, and detecting, at the second content distributor, the presence of a pre-existing watermark in the content. In response to the detecting, the above noted method includes erasing the pre-existing watermark, erasing the preexisting watermark, embedding a new watermark in the content in the content using an embedder at the second content distributor, and transmitting the content to a client device. For example, the watermark symbols of the new watermark are substantially aligned with symbols of the preexisting watermark. Such a method can further include sending information to the embedder relating to the technology and location of the pre-existing watermark. In some embodiments, the detected watermark identifies a broadcast, its timeline and a first content distributor metadata server having interactive service information. Further, the second content distributor overwrites the detected watermark, the second content distributor retrieves interactive service information from the first content distributor metadata server and provides this information on its own metadata server.

In some embodiments, the detected watermark identifies a broadcast, its timeline and a first content distributor metadata server having interactive service information. In such embodiments, the method for overwriting a watermark further includes storing the watermark information which was overwritten along with its timing information on the second content distributor's metadata servers, and detecting the new watermark at the client device. Further, in response to the client's detecting of the new watermark, overwritten information is requested from the second content distributor's metadata server, and the overwritten information is provided to the client device. In certain embodiments, the client contacts the first content distributor's metadata server to obtain the first content distributor's interactive service information.

In some embodiments, the first and second content distributors comprise one or more of: a broadcast television network, a local television station, a cable television network, an online video service, or a CDN. In some embodiments, the content includes at least one of: a syndicated program segment, a prerecorded programming, a live programming, a user generated video, or a streaming content.

According to another exemplary embodiment, a method for layering a watermark is provided that includes receiving content from a first content distributor at a second content distributor, detecting at the second content distributor the presence of a pre-existing watermark in the content. The method further includes, in response to detecting the presence of a pre-existing watermark, embedding a new watermark in the content using a set of watermark parameters that are different from a set of watermark parameters used to create the pre-existing watermark, the new watermark being in a different watermark layer, and transmitting the content to a receiver. In one exemplary embodiment, such a method further includes sending information to the embedder that relates to the technology and location of the pre-existing watermark. In another exemplary embodiment, the embedding is performed using an embedder at the second content distributor.

Example Latency Considerations:

As mentioned above, typically in order to ensure overwriting of a preexisting watermarks with minimum impact on content quality, embedder needs information on location (e.g., temporal location) of preexisting watermarks, and in particular the location of watermark symbol boundaries.

Typically determination of the watermark location requires extraction of preexisting watermarks and additional processing which can introduce some latency or delay in the overwriting operations. For example, the extractor may need to "look ahead" to determine if a preexisting watermark is present in a section of the content that is ahead (e.g., by at least one time interval that corresponds to a watermark duration) of the present content location that is being overwritten with new watermarks. When the extractor finds such a preexisting watermark, it provides the location information to the embedder so that the preexisting watermark can be effectively overwritten (e.g., from its starting location) with the new watermark.

The operations for detecting the presence of the preexisting watermarks causes latency (e.g., an initial delay) in the overwriting operations which is often undesirable in the content distribution chain, and thus needs to be minimized. In some embodiments, latency is reduced by allowing the extractor to "look-ahead" of the embedder for a time interval that corresponds to a fraction of a full watermark duration. Similarly, in spatial domain, the "look-ahead" distance can correspond to a fraction of a watermark spatial extent. When the "look-ahead extractor" finds a preexisting watermark, it provides the embedder with location information of the preexisting watermark, and the embedder can overwrite the portion of the watermark (rather than the full watermark) that is identified by the location information. This means, that only a portion (or fragment) of the preexisting watermark is overwritten. Yet, in many cases, overwriting only a fragment of a watermark is enough to make the watermark undetectable.

In some embodiments, in order to maintain a reduced latency between extraction and embedding, the watermark packet fragment overwriting is accomplished by strategically overwriting a number of watermark symbols that effectively render the preexisting watermark unreadable. For example, and as noted earlier, the watermark payload is typically protected by an error correction code (ECC). In some embodiments, the erasing of the watermark message is effectuated by inverting a string of symbols (e.g., at the end of the watermark packet). The inversion causes a symbol to have an opposite value (or a value that is at a maximum distance from) the originally embedded symbol. For example, in the case of binary symbols, inversion is achieved by overwriting a 0-value bit by a 1-value bit, and vice versa. By selecting the number of symbols that are inverted to be slightly larger than the maximum error tolerance (e.g., error correction capability or error detection capability) of the applied ECC, the watermark packet becomes unreadable by a watermark extractor that relies on ECC-decoding to extract the embedded watermarks. For example, if the watermark message is protected by an error correction code that adds 10 parity symbols to the watermark packet and enables up to 5 symbol errors to be corrected, inverting 6 symbols of the pre-existing watermark message renders that watermark undetectable. Typically the inverted symbols are at the watermark end, and Experiments conducted by the inventors reveal that full removal of a preexisting watermark can be achieved by inverting less than 10% of the watermark symbols.

In some embodiments, overwriting a portion of the pre-existing watermark message and embedding of a new watermark message can be accomplished by detecting a pre-existing watermark, inverting the symbols at the tail end of the pre-existing watermark (which ensures that the pre-existing watermark is rendered undetectable) and inserting the new watermark message into to the primary content. For example, the first symbol of the new watermark message can be embedded immediately after the inverting process is ended. Subsequent symbol overwriting, where boundaries of newly embedded symbols approximately match the boundaries of the preexisting symbols, achieve simultaneous erasure of old watermarks as well as embedding of new watermarks. When the overwriting latency is not an issue, the embedder can wait for the detection of entire pre-existing watermark, and then start embedding a new watermark message from the starting location of the pre-existing watermark. In this case, the overwriting latency is larger than, or equal to, the pre-existing watermark duration.

In some scenarios, distributors may want just to erase preexisting watermarks without inserting their own watermarks. For example, a distributor may discover watermarks that trigger targeted ads, but the distributor may want to disable those targeted ads in order to insert its own ads directly into audiovisual content. One way to achieve this is to overwrite the preexisting watermarks with new "erasure" watermarks that prevent the receiver to access information from the preexisting watermarks. Those erasure watermarks can have a predefined symbol pattern(s) that are reserved for the erasure watermarks and are not used in other watermark packets. Moreover, instead of overwriting the entire watermark packet, the embedder may overwrite only a fraction of the packet symbols as described above, in order to reduce latency of the erasure process. As described above, in order to erase the pre-existing watermarks, the embedding process for the new watermark message has to be preceded with detection of the pre-existing watermark location, including approximate detection of the location of symbol boundaries.

In certain scenarios, dither embedding is used to insert watermarks into sections of the content devoid of significant activity (e.g., silent or quite intervals, flat areas, etc.), which are not naturally suitable for insertion of watermarks. Dither signal is generally a low amplitude signal that resembles noise and can be shaped so that when added to a content, it does not produce objectionable or even perceptible artifacts. By modulating the dither signal in a particular manner, different watermark symbol values can be inserted into the sections of the content that are devoid of significant activity, while preserving imperceptibility of the embedded watermarks. According to some embodiments, overwriting or erasure of watermarks in dither-embedded sections of a content can be accomplished by removing the preexisting dither using, e.g., noise gate that is adjusted to remove only signals as small as dither. A typical noise gate processing uses a "gate" to attenuate signals below a threshold and allows signals to pass through when they are above the threshold. After removing the preexisting dither, new dither embedding can be applied to insert the new watermark. Using this technique, perceptual quality of the content is preserved by avoiding the built up of dither signals due to multiple rounds of dither embedding.

In certain aspects of the disclosed embodiments, a method for reducing latency during watermark overwriting or erasure includes detecting the location of preexisting watermarks using a watermark extractor. In response to the detection, informing a watermark embedder of the location of the detected watermark, including approximate boundaries of preexisting watermarks and overwriting, e.g. by inverting preexisting symbols, the detected watermark from its current position, wherein its current position is subsequent to the beginning of the watermark, and wherein only a fraction of the watermark is overwritten while the detected watermark is rendered undetectable. In one exemplary embodiment, the location of the detected watermark is a temporal location of the detected watermark. In another exemplary embodiment, the watermark payload is carried in packets that include an error correction code having a maximum error tolerance. In this embodiment, the method for reducing latency of pre-existing watermark erasure further includes overwriting a packet fragments at the end of the watermark packets by inverting a string of pre-existing symbols that is longer than the maximum error tolerance of the error correction code. In another exemplary embodiment, the method of reducing latency of overwriting the preexisting watermarks further includes inverting a string of pre-existing symbols that is longer than the maximum error tolerance of the error correction code in the first pre-existing watermark, followed by overwriting subsequent pre-existing watermarks. In some embodiments, the detected watermark contains a dither signal and the method for reducing latency further includes removing the dither signal in the detected watermark using a noise gate, and embedding a new dither watermark, whereby multiple dither signals do not build up.

In certain aspects of the disclosed embodiments, a method for erasing a watermark includes detecting a watermark in a content, and overwriting the detected watermark by embedding an erasure watermark in the content. The erasure watermark contains a predefined bit pattern that causes a watermark detector to ignore the detected watermark. In some embodiments, only a fraction of the detected watermark is overwritten, whereby latency is reduced. In some embodiments, the pre-existing watermarks are overwritten but the new watermarks are embedded with an embedding strength that is below embedding strength of pre-existing watermarks, or below embedding strength of regular overwriting watermarks, in order to minimize impact on quality of the content.

Example Trigger Flag Embedding Considerations:

In some instances, trigger flag is used when the temporal location of an interactive service or an ad insertion in a content is not known in advance, as is the case in many live events. As noted earlier, in some scenarios where a client device has Internet connectivity, a client device can initiate an exchange with a web server. If the client device doesn't know the exact time when the information associated with the content becomes available on the server, the client device can periodically poll the server. Such a polling scenario may be undesirable because it burdens the server and increases Internet traffic. Therefore, a trigger flag provides an alternative, where the trigger flag is embedded as part of the watermarks in the content, and the client device can query the server when it detects the trigger flag, or a change in the trigger flag.

As also noted earlier, the trigger flag can be comprise multiple bits, or can simply a bit in the watermark payload. This bit can be set to a first value (e.g., "True") to provide an indication to the devices to access the server. Alternatively, a toggle (state change) of the trigger bit can provide an indication to the client devices to access the server. A benefit of using the trigger flag in a "toggle" configuration is that the trigger indication can be more resilient to watermark packet detection loss or cueing functions such as "skip ahead." For example if the initial watermark message has a trigger flag in state "True" (or "1") and the embedder starts embedding watermark messages with a trigger flag in state "False" (or "0"), even if the receiver misses the first message with toggled trigger flag (e.g. due to distortion, mute in set-top-box, or skip ahead), the detection of any of subsequent messages with toggled trigger flag will trigger a query to the server and receive the updated information.

When the trigger bit is included as part of the watermark payload, there is a latency associated with embedding of the trigger bit of at least one watermark packet duration. That is, it takes at least one watermark packet duration, from the moment when embedder is instructed to embed the trigger flag until the entire packet, including the trigger bit, is embedded. Furthermore, if preexisting watermark are being overwritten while preserving interactivity information, the latency is further increased because the overwriting embedder first needs to detect the presence of the trigger flag, and subsequently to create the watermark payload with the trigger flag. In some scenarios, such as in case of live broadcasts or streaming operations, this latency may be undesirable.

In some embodiments, the trigger flag can be embedded independently from the regular watermark payload. For example, the trigger flag can be embedded as a one-bit watermark in an independent, noninterfering watermark layer with respect to the remaining bits of the watermark payload. For instance, the first watermark layer may include watermark symbols that are used to identify the metadata and/or to identify the location of the watermark within the content (which can be used to schedule interactivity or targeted ad insertion). The trigger flag may be carried in a second layer, and when detected, can provide an indication that the server identified in the first layer can be queried. In this case, the watermarks in the first layer that are used to identify the server that contains additional programs or services may be embedded in the primary content at a location that is well ahead where the trigger flag is needed, and embedding of only the trigger flag, as needed, as part of the second layer is much quicker than embedding the trigger flag as a part of a full payload of watermarks in the first layer. Note that one bit watermarks (or short watermarks having only a few bits) can be embedded as a shorter watermark packet than watermarks carrying larger payloads, say 50 bits, which reduces latency associated with detection of the flag bit. Embedding of the trigger flag in an independent watermarking layer can also reduce latency in scenarios where overwriting is to take place. In particular, when the non-trigger flag information in the first layer of is overwritten, the trigger flag doesn't have to be overwritten; this way there is no increased trigger latency due to overwriting.

In yet other embodiments, trigger flag signaling is carried out by inversion of a fragment of pre-existing watermark bit-string. Generally, embedded watermarks are redundantly embedded in multiple locations within the content, and the extractor can predict the incoming watermark bit-strings because of such redundant embedding. One method for extraction of watermarks involves comparing the detected watermark bit string obtained from the content to an expected bit string and counting the number of mismatches. When flags are embedded using the inversion of pre-existing watermark bit strings, a large number of mismatches (i.e., above a certain threshold) indicates that a trigger flag is detected, which allows the device to access the web server using, for example, server identification information that the client device has saved from previous extractions. This is particularly useful in implementations that, upon detection of the first watermark bit string, the detector can predict subsequent bit strings. That is, the detector can predict likely locations of subsequent bits (or symbols), extract those bits and assess whether or not the extracted bits constitute a valid watermark message (or portions thereof). The detection of watermarks based on such prediction techniques allows detection of watermarks with a higher error tolerance compared to independent detection without such predicted information.

A watermark extractor that is configured to utilize a prediction algorithm can confirm the existence of subsequent watermarks even when those watermarks are damaged and tolerate a relatively high number of bit errors, up to a predefined first threshold. The prediction of subsequent bit strings can be done even on a fragment of the subsequent bit string, e.g., for a bit string of a predefined length rather than the entire length of a watermark packet. In particular, when the embedder inverts the embedded bit string of the pre-existing watermark to indicate the presence of a subsequently embedded flag field, a detector not only finds that bit errors are above the predefined first threshold (which indicates an absence of the expected watermark), but also finds that the number of errors is higher than a second much higher threshold. The detection of such a watermark signifies that the watermark symbols are embedded as an inverted pattern, which provides an indication to the receiver device that additional programs or services can be received upon contacting the server. Detections based on prediction of a fragment of a full watermark string makes it possible to initiate queries to the server quicker compared to implantations that require detection of the flag field as part of a larger payload.

In the case of overwriting, the "look-ahead extractor" described earlier can also detect the bit-string inversion and inform the embedder about the presence of the trigger flag. The embedder can then chose to invert its own bit-string in the same fragment where the preexisting bit-string had been inverted in the case where the trigger flag needs to be retransmitted in as part of the overwriting operation. Using this technique, only look-ahead latency of one fragment is added during the overwrite process, which can be much smaller than the entire watermark duration, as explained above. In this case, the look-ahead latency is determined by the time it takes to detect the fragment that signals the presence of inverted bit pattern. Thus as soon as the detector that is operating to detect of the pre-existing watermarks detects the inversion associated with the pre-existing flag field, the embedder can start inverting the bit pattern of the new watermarks that are overwriting the pre-existing watermarks in order to retransmit the same trigger flag.

The above noted embodiments that describe trigger flag insertion are not mutually exclusive, and can be combined in different ways. For example, the same content can include trigger flags that are embedded as part of a regular payload along with other information, as well as trigger flags that are embedded based on fragment inversion. In one particular example, for ad pods (e.g., multiple ad elements that are sequenced together and played back-to-back in a singular ad break) where the first ad element is a nationwide ad with a known duration, and subsequent ads are targeted ads to be downloaded from a server, the trigger flag can be safely sent as part of a regular watermark payload during the nationwide ad. For example, after detecting the trigger flag, the receiver device can contact the server and receive the information (e.g. a URL) where the replacement ad is located, as well as the timing information for the replacement AD. Then the receiver device can download the replacement ad, and launch it at the provided time. The time between the trigger flag detection and ad insertion in this case is typically more than 15 seconds.

Yet for trigger flags that are time sensitive, such as trigger flag that cause the display of statistics for a player that is just entering the field in a sporting event, the trigger flag can be inserted using fragment inversion. In this case, as soon as the fragment inversion is detected, the receiver device can contact the server and obtain the statistics for the player entering the field. This way, the time between the player entering the field and the display of associated statistics can be less than one second.

Each trigger flag is typically embedded multiple times to ensure its detectability in the presence of signal impairments (e.g., introduced by transcoding in redistribution). Such multiple instances of triggers should be identified as the same trigger by the client device to avoid sending multiple queries to a metadata server. In one example, more than one watermark fragment is consecutively inverted, and the detection of any one of those inverted fragments triggers a query to the server, asking about new information. Trigger flags embedded as one-bit messages in an independent watermarking layer can also be repeated multiple times. Even trigger flags that are part of a bigger payload can be repeated multiple times. In all those cases, when the trigger flag is detected in consecutive intervals, the receiver device can send a query to a server only upon the first detection of the trigger flag, and to consider subsequent trigger flags as redundant, and ignore them.

In certain aspects of the disclosed embodiments, a method for causing a client device to contact a server includes embedding a content with a watermark containing a trigger flag, detecting the watermark containing the trigger flag at a client device, and in response to the detecting of the watermark containing the trigger flag, initiating an exchange between the client device and a web server. In some exemplary embodiments, the trigger flag includes a particular bit in the watermark and changes in the state of the bit causes the client device to contact a particular web server. In one embodiment, the watermark containing the trigger flag is part of the payload of a watermark that conveys additional information. In another exemplary embodiment, the watermark containing the trigger flag is located in a separate watermark layer from an additional watermark containing additional information. In yet another embodiment, a watermark in a first watermark layer identifies a web server from which metadata is available and the temporal location of an event in the content, and a watermark in a second watermark layer contains the trigger flag such that when the trigger flag is detected by a client the client will query the web server identified in the watermark in the first layer. In still another exemplary embodiment, the trigger flag includes an inversion of a fragment of a watermark bit string.

Figure 3:
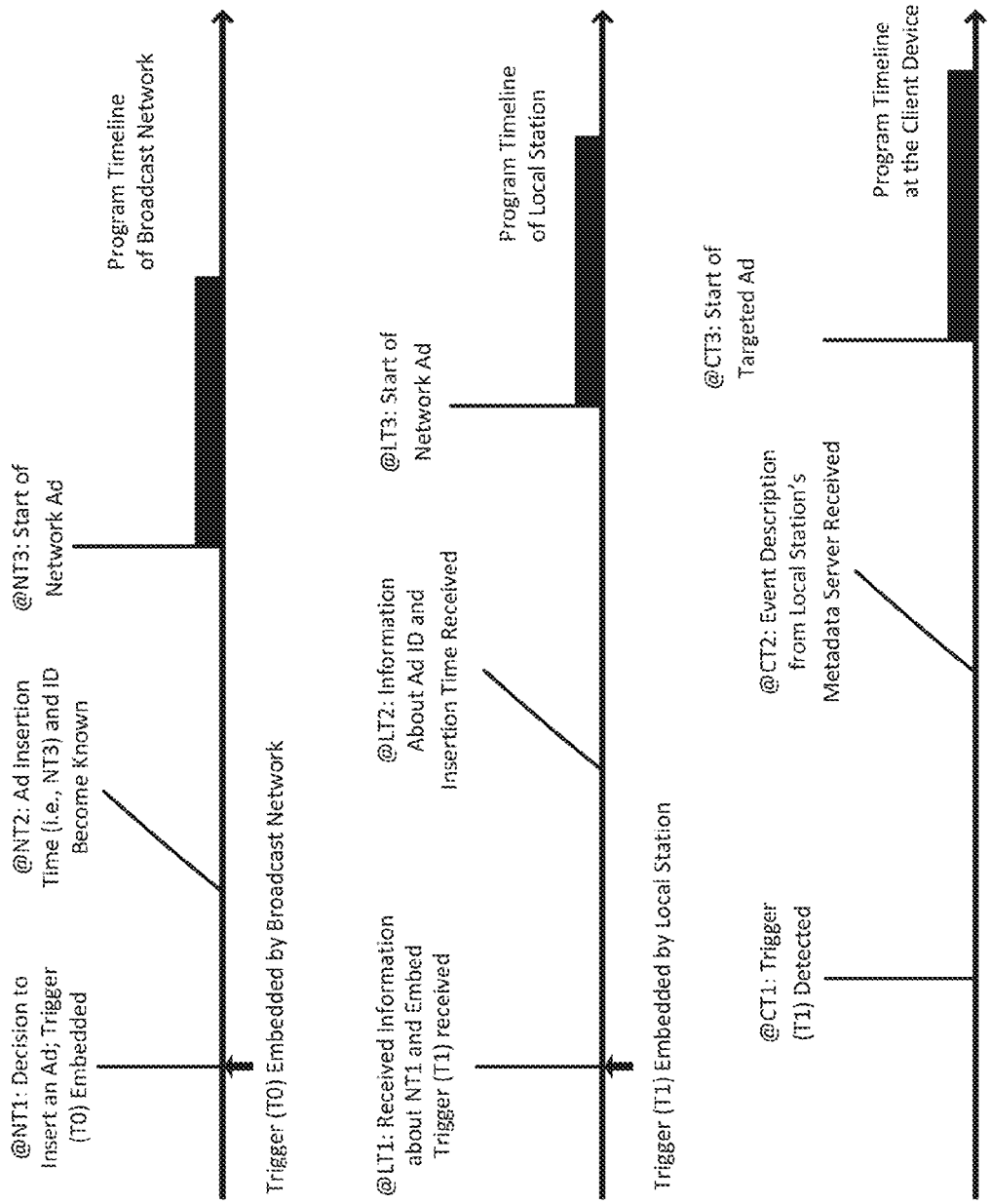
FIG. 3 illustrates the insertion of advertisements in a content in certain exemplary embodiments.

Example Embedding of Live Content Considerations:

Trigger flags enable the client device to receive the event description prior to actual happening of such events so that the client can prepare for execution of events such as launching an interactive application or inserting a targeted ad. Scheduling for interactive activity or ad insertion events for live content often requires adjustments by human operators due to unexpected interruptions such as injury timeout in sport events, breaking news, or other breaks. FIG. 3 illustrates the insertion of advertisements in a content in certain exemplary embodiments. In FIG. 3, three timelines are shown: the top most timeline illustrates the events that occur with respect to the broadcast network program timeline, the middle section illustrates the events that occur with respect to the local network program timeline, and the bottom section illustrates the events that occur with respect to the client device program timeline. In one scenario, the broadcast network inserts a national commercial (e.g., a 30-second advertisement) once a program break occurs, and the local station is interested in replacing the national commercial by local ads. In this scenario, an embedder at the broadcast network embeds a trigger (e.g., T0 as shown in FIG. 3) upon a determination of a commercial break by an operator at time instance NT1. This trigger and the associated timing information is registered with the network's metadata server. At the same time, the information about the trigger is delivered by the network to local stations. One way to deliver this information to the local stations' metadata server(s) from the network's metadata server is to use various push technologies (e.g., through Internet), such as instant messaging, HTTP server push (also known as HTTP streaming), HTTP long polling, and Pushlet based on persistent HTTP connections between network's metadata server and local stations' metadata servers. It should be noted that servers other than metadata servers can be used by the broadcast network to push such information to local stations.

Shortly after the decision for a commercial break and ad insertion is made, a network-wide advertisement is obtained or selected for inserted into the network program. Once the advertisement is selected or obtained, and its time of insertion becomes known (e.g., at time instance NT2 as shown in FIG. 3), information (e.g., event description) including at least the actual insertion time (e.g., NT3 as shown in FIG. 3) and an identifier of the advertisement is also registered with network's metadata server. This information is then delivered to the local stations' metadata server using, for example, one of the above described push technologies.

When the local station receives the information about the trigger and the complete or part of the event description provided by the broadcast network, it most likely have not received the corresponding program/advertisement transmitted over the satellite or cable networks due to latencies that are, for example, introduced between the time when a commercial break starts and the time when an advertisement is actually inserted, due to latencies introduced as a result of watermarks embedding (if any), multiplexing, and/or satellite transmission of the program. The local stations can take advantage of the accumulated latency (which can be a few seconds) to prepare the watermark embedder for embedding a trigger in the local station's watermark sufficiently prior to the time at which the commercial is actually inserted by the network. In fact, a local station may embed a trigger (e.g., T1 as shown in FIG. 3) once it receives the trigger information from the broadcast network (e.g., at time instance LT1 as shown in FIG. 3) and at the same time register such trigger in the local station's metadata server. Local station's embedder may overwrite the watermarks including the trigger embedded by the broadcast network (e.g., trigger T0 as shown in FIG. 3), as discussed earlier.

Once the local station receives the event description (e.g., information about the ad and the actual timing of the advertisement inserted by the network), it populates (e.g., at time instance LT2 as shown in FIG. 3) its own metadata server with the event description and its associated trigger (e.g., trigger T1 as shown FIG. 3) embedded by an embedder of the local station.

Referring now to the bottom section of FIG. 3, once the client device detects (e.g., at time instance CT1 as shown in FIG. 3) a watermark trigger embedded by the local station from the received program (e.g., received through an MVPD retransmission), it sends a query to the local station's metadata server for the event description. It is most likely that the event description is already available on local station's metadata before the program arrives on the client device due to the latencies introduced by 1) program transmission from the local station to the MVPD, 2) potential transcoding performed by the MVPD prior to delivering the program to MVPD headends, and/or 3) program transmission from the MVPD centers to headends. The accumulated latency can be a few seconds.

After the client device receives the event description from the local station's metadata server (e.g., at time instance CT2 as shown in FIG. 3), it prepares for the execution of the event, such as downloading the targeted advertisement specified in the event description from an ads server and preparing for ad decoding (e.g., if the ad insertion takes place in baseband), or downloading an interactive application from the application server. Using the timing information in the event description, the client device inserts the downloaded ad or launches the interactive application (e.g., at time instance CT3 as shown in FIG. 3) once the program timeline matches the timing of the event. When inserting ads in the baseband domain (e.g., non-compressed domain), the ad insertion can start in any video frame, while if insertion is done in a compressed domain (e.g., in H.264 and MPEG-4 encoded Video), the insertion has to start with at particular locations (e.g., at an Instantaneous Decoder Refresh (IDR) frame) in order to avoid artefacts.

In some instances, when the program is delivered to the client from the MVPD redistribution system, the client device may receive the program through an HDMI interface. In such a case, the ad insertion in the client device can take place in baseband by switching the output from the program to the ad. Moreover, it is possible to have more than one event happening at the same time. For example, in one scenario, the broadcast network enables an interactive feature by using its watermark (which may be overwritten but recoverable by local station's metadata server as discussed earlier) and the local station enables a targeted ad insertion by using the local station's watermark. In another scenario, the local station may enable two concurrent events such as targeted ad insertion and playback of downloaded secondary content. In both of the above scenarios, the two events may be overlapping in media timeline, and can require simultaneous media decoding. One approach to allow simultaneous decoding of two the two media is to allow the client device to deploy at least two audio and video decoders so that the audio and/or visual content from both events can be decoded simultaneously. However, if the client device has only one audio and/or video decoder, part of the content needs to be decoded and buffered in advance for switching. It may also require the decoder to be reconfigurable to switch between decoding different content files or buffers.

In some embodiments, the metadata (including the trigger information and event description) is delivered at real-time from the broadcast network's metadata server (or another communication server) to local stations' metadata server or separate communication servers using Internet push technologies.

In another embodiment, such metadata can also be delivered as part of broadcast channel such as the closed caption channel, or as metadata in program transport streams such as metadata in MPEG-2 transport stream or ISOBMFF, via broadcast, broadband and hybrid transmission methods. In this case, the broadcast network inserts both the trigger and associated event description as in-stream metadata that precedes the actual occurrence of ad insertion. Once the local station receives the in-stream metadata from the broadcast network, the local station embeds the trigger (e.g., trigger T1 as shown in FIG. 3) and adds the trigger and its associated event description into the local station's metadata server. The client device behavior remains the same as described earlier.

In another embodiment, the program is transcoded and delivered to the client via broadband using content streaming technologies such as DASH (Dynamic Adaptive Streaming over HTTP). In this case, the ad insertion in the client takes place in the compressed domain by splicing the compressed ad into the compressed program.

In certain aspects of the disclosed embodiments, a method for notifying a client about an upcoming event occurring in content includes embedding a first trigger flag watermark in a content by a first content distributor, where the first trigger flag watermark is associated with timing information regarding an event. The above noted method further includes registering information relating to the first trigger flag watermark with a metadata server of the first content distributor, delivering information related to the first trigger flag watermark to a second content distributor's metadata server, and registering an event description with the first content distributor's metadata server. The above noted method also includes delivering the event description to the second content distributor's metadata server, embedding a second trigger flag watermark into the content by the second content distributor, registering information related to the second trigger flag watermark in the second content distributor's metadata server, and receiving the event description and timing information at the second content distributor. The above noted method additionally includes populating the second content distributor's metadata server with event description and its associated second trigger flag watermark information, detecting the second trigger flag watermark by a client device in content received from the second content distributor, and sending a query from the client device to the second content distributor's metadata server for the event description. The above noted method further includes receiving the event description by the client device from the second content distributor's metadata server, preparing for execution of the event by the client device, and executing the event by the client device at the time when a program timeline in the content matches the event timing information.

In some exemplary embodiments, the event description includes insertion time and an identifier of a content to be inserted. In one exemplary embodiment, the above noted method further includes overwriting the first trigger flag watermark by the second content distributor. In another exemplary embodiment, preparing for the execution of the event comprises downloading a targeted ad. In still another exemplary embodiment, preparing for the execution of the event comprises downloading an interactive application. In yet another exemplary embodiment, executing the event comprises inserting a targeted ad. In one exemplary embodiment, executing the event includes launching an interactive application. According to another exemplary embodiment, the client device receives the content through an HDMI interface. In another exemplary embodiment, the client device receives the content through a streaming technology. In yet another exemplary embodiment, multiple events occur simultaneously.

Figure 4:
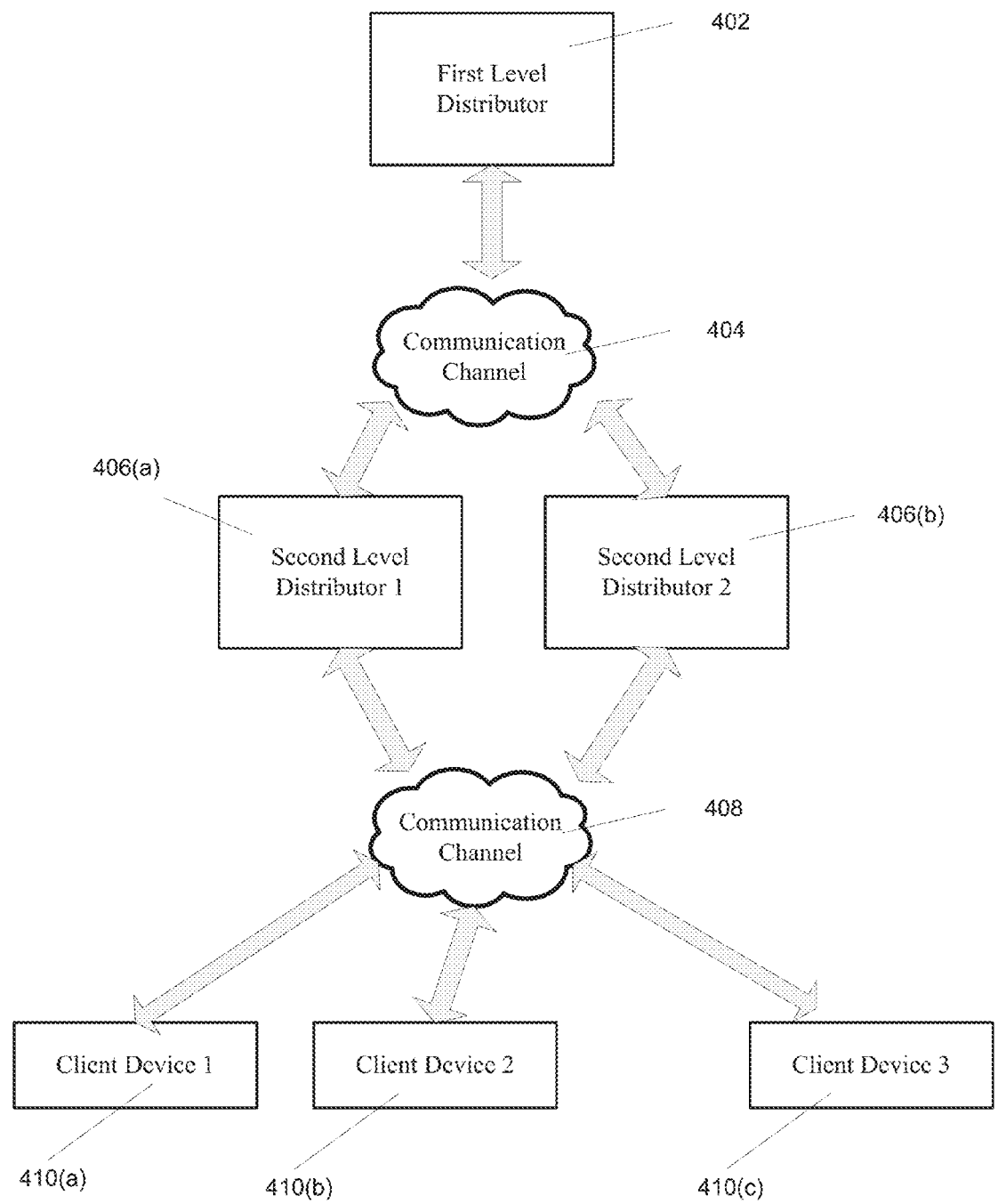
FIG. 4 is a simplified diagram of a distribution chain of a multimedia content that can accommodate various disclosed embodiments.

FIG. 4 provides a simplified diagram of a distribution chain of a multimedia content within which various disclosed embodiments can be implemented. The First Level Distributor 402 in FIG. 4 can be a national distributor of content that provides a various programming, advertisements and other types of content to one or more second level distributors through the communication channel 404; two of the second level distributors are depicted as Second Level Distributor 1 406(a) and Second Level Distributor 2 406(b). In the context of certain disclosed embodiments, a second level distributor can be a local television station that receives the content from the first level distributor and can analyze and modify portions of the national broadcast content. For example, the local distributor can perform watermark extraction to detect pre-existing watermarks including trigger flags that may be embedded in the content. The local or second level distributor can, alternatively or additionally, receive information regarding types, locations, values and other aspects of watermarks that are embedded in the content that it receives from the First Level Distributor. The second level distributor can embed additional watermarks in the received content, erase the embedded watermarks or overwrite the embedded watermarks in order to augment, modify or disable delivery of metadata and auxiliary programs or services that are associated with a primary content.

The second level distributor then delivers, through the communication channel 408, the content to one or more client devices, such as Client Device 1 (identified as 410(a)), Client Device 2 (identified as 410(b)) and Client Device 3 (identified as 410(c)) that are depicted in FIG. 4. For example, a second level distributor, which is a local station, can replace national advertisements in the received content with a local advertisement along with an embedded watermark that allows retrieval of an interactive content that is presented at the client device in synchronization with the local advertisement. At each stage of watermark embedding, metadata associated with the pre-existing watermarks or with the primary content may be modified, augmented or replaced. For example, each second level distributor can augment a pre-existing metadata with its own station identification, secondary programs or services, and update the associated metadata servers. It should be noted the entities shown in FIG. 4, each can include one or more devices, databases, servers and other components that send and receive the described content, information and signals, and perform various signal processing operations on the multimedia contents (e.g., formatting, decoding, transcoding, filtering, etc.), as well as extract embedded watermark and/or embed new watermarks.

Figure 5:
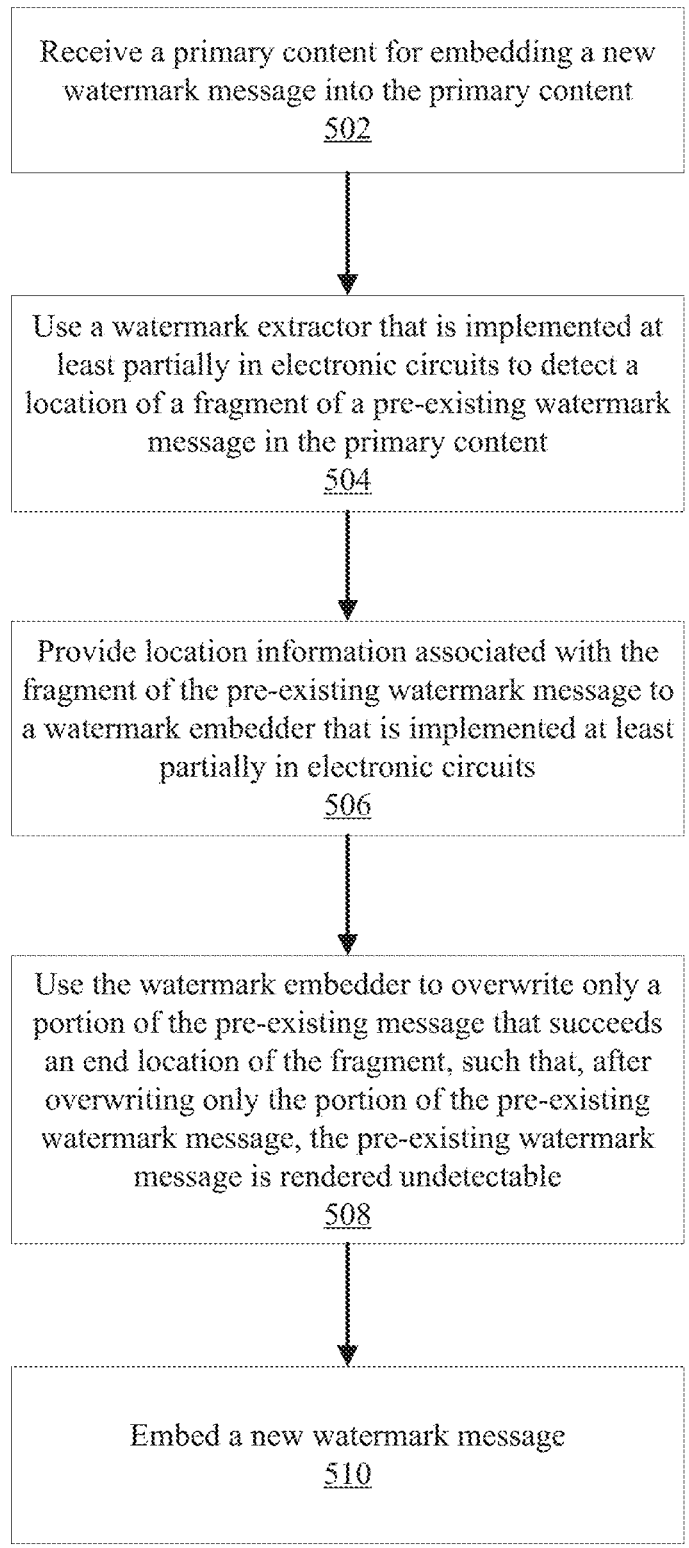
FIG. 5 illustrates a set of operations for improving watermark embedding operations in accordance with an exemplary embodiment.

FIG. 5 illustrates a set of operations for improving watermark embedding operations that includes, at 502, receiving a primary content for embedding a new watermark message into the primary content. At 504, using a watermark extractor that is implemented at least partially in electronic circuits, a location of a fragment of a pre-existing watermark message is detected in the primary content. At 506, location information associated with the fragment of the pre-existing watermark message is provided to a watermark embedder that is implemented at least partially in electronic circuits. At 508, using the watermark embedder, only a portion of the pre-existing message that succeeds an end location of the fragment is overwritten such that, after overwriting only the portion of the pre-existing watermark message, the pre-existing watermark message is rendered undetectable. At 510, a new watermark message is embedded.

Figure 6:
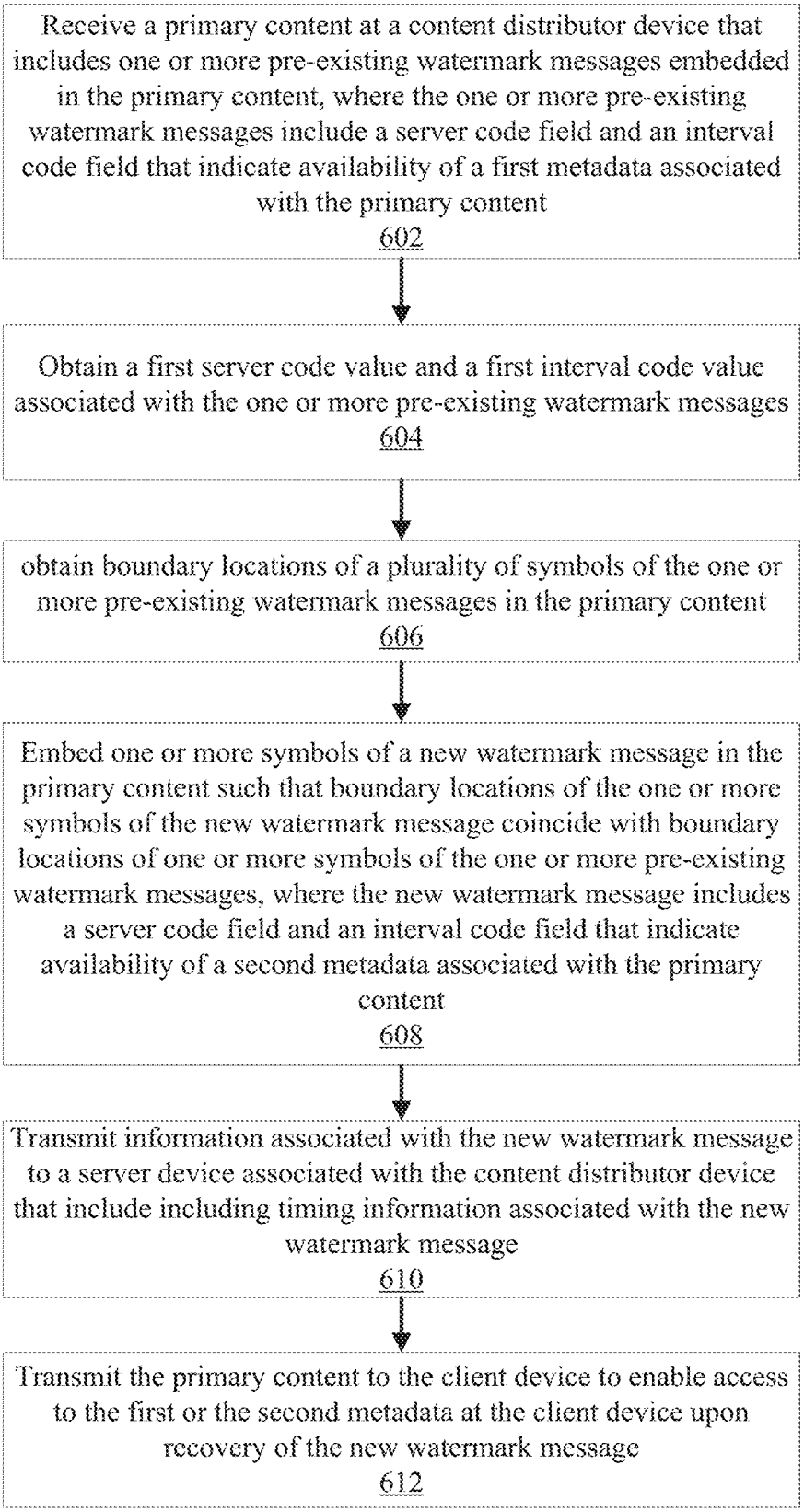
FIG. 6 illustrates a set of operations that can be carried out to enable delivery of metadata associated with a primary content to a client device in accordance with an exemplary embodiment.

FIG. 6 illustrates a set of operations that can be carried out to enable delivery of metadata associated with a primary content to a client device. At 602, the primary content is received at a content distributor device, where the primary content includes one or more pre-existing watermark messages embedded in the primary content. The one or more pre-existing watermark messages include a server code field and an interval code field that indicate availability of a first metadata associated with the primary content. At 604, a first server code value and a first interval code value associated with the one or more pre-existing watermark messages are obtained. At 606, boundary locations of a plurality of symbols of the one or more pre-existing watermark messages in the primary content are obtained.

At 608, using watermark embedder, which is implemented at least partially in electronic circuits, one or more symbols of a new watermark message are embedded in the primary content such that boundary locations of the one or more symbols of the new watermark message coincide with boundary locations of one or more symbols of the one or more pre-existing watermark messages. The new watermark message also including a server code field and an interval code field that indicate availability of a second metadata associated with the primary content. It should be noted that when the boundary locations of the symbols of the new and pre-existing watermark messages are aligned, the symbols of the pre-existing watermarks are overwritten such that subsequent attempts to detect those symbols would fail to detect the symbols of the pre-existing watermark message. In the context of the above description, coincidence (or alignment) of boundaries of the new and pre-existing watermark symbols does not require that the boundaries precisely coincide (e.g., at identical primary content sample locations). Rather the degree of coincidence must be such subsequent attempts to detect the overwritten symbols would fail to detect those symbols. For example, experiments conducted by the inventors have shown that 90% or more overlap between the symbols of the new and pre-existing watermarks renders the pre-existing symbols undetectable.

Referring again to FIG. 6, at 610, information associated with the new watermark message is transmitted to a server device associated with the content distributor device. Such transmitted information includes timing information associated with the new trigger field. At 612, the primary content is transmitted to the client device to enable access to the first or the second metadata at the client device upon recovery of the new watermark message.

In some embodiments, one or both of the following is true: (a) a value of the server code field of the new watermark message differs from the first server code value, or (b) a value of the interval code of the new watermark message differs from the first code value. In another exemplary embodiment, the server code value and the interval code value associated with the new watermark message enable retrieval of a second program or service associated with the primary content, and the server code value and the interval code value associated with the one or more pre-existing watermark messages enable retrieval of a first program or service associated with the primary content. In some embodiments, the first program or service or the second program or service is one of: an advertisement, a targeted advertisement, an interactive program, or a secondary video content. In still another embodiment, the server code value and the interval code value associated with the new watermark message enable retrieval of the second metadata that is different from the first metadata.

According to one exemplary embodiment, one or more pre-existing watermark messages include a trigger field that is indicative of a change in the first metadata, and embedding the one or more symbols of the new watermark message includes embedding a new trigger field associated with the new watermark message. In another embodiment, at least one of: (a) the first server code value, (b) the first interval code value, or (c) the boundary locations of the plurality of symbols of the one or more pre-existing watermark messages is obtained using a watermark extractor to extract the plurality of symbols of the one or more pre-existing watermark message. In yet another embodiment, at least one of the above noted items (a), (b) or (c) is received at the content distributor device through a communication channel coupled to the content distributor device. For example, such information is pushed to the content distributor device through the communication channel through a push technology.

In another exemplary embodiment, the above noted method also includes storing the first server code value and the first interval code value at the server device associated with the content distributor device to allow subsequent retrieval of the first metadata upon detection of the new watermark message by the client device. In still another embodiment, the above method further includes receiving update information associated with the one or more pre-existing watermark messages, the update information including a new server code value or a new interval code value associated with the one or more pre-existing watermark messages that enable retrieval of: the first metadata, a first program or service, or an additional program or service, from a metadata server. In some embodiment, the above noted method additionally includes providing the update information to the client device in response to a request initiated by the client device.

According to one exemplary embodiment, the method that described in connection with FIG. 4 further includes using the first server code value and the first interval code value associated with the one more pre-existing watermark messages to retrieve the first metadata or a first program or service associated with primary content, storing the first metadata, or the first program or service, at the server device associated with the content distributor device, and providing the first metadata, the first program or service, or instructions for obtaining the first metadata or the first program or service, to the client device in response to a request initiated by the client device. In some embodiments, the primary content is received from another distributor in distribution chain of the primary content.

In another embodiment, wherein the primary content is received from one of a broadcast television network, a local television station, a cable television network, an online video service, or a content delivery network (CDN). The primary content can include at least one of: a syndicated program segment, a prerecorded programming, a live programming, a user generated video, or a streaming content. In another embodiment, the content distributor device is located a local television station, the primary content is received at the local television station from a national broadcaster, and the one or more symbols of a new watermark message enable the client device to augment or replace the first metadata with the second metadata.

According to another embodiment, embedding the one or more symbols of the new watermark message comprises inverting one or more symbols of a first pre-existing watermark message to signal existence of a new trigger value, such that upon a subsequent attempt to extract the first pre-existing watermark message from the primary content, the detected first pre-existing watermark message includes more than a predefined number of erroneous symbols, indicating an unreliable watermark. In one exemplary embodiment, inverting one or more symbols of a first pre-existing watermark message includes inverting a symbol of the first pre-existing watermark message designated to carry the trigger field associated with the one or more pre-existing watermark messages.

In another exemplary embodiment, embedding the one or more symbols of a new watermark message overwrites fewer than all symbols of a first pre-existing watermark message, and renders the first pre-existing watermark message undetectable upon a subsequent attempt to extract the first pre-existing watermark message from the primary content. In yet another exemplary embodiment, the first pre-existing watermark message is recoverable upon detection of the first pre-existing watermark message with less than a first number of erroneous watermark symbols, and the watermark embedder overwrites a second number of symbols of the first pre-existing watermark message that equals or exceeds the first number. In another exemplary embodiment, the first pre-existing watermark message comprises a plurality of parity symbols associated with an error correction code, and the watermark embedder overwrites a first number of symbols of the first pre-existing watermark message that exceeds maximum number of symbols that can be corrected by the error correction code In another exemplary embodiment, at least a portion of the first pre-existing watermark message is located within a segment of the primary content that includes a dither signal, and overwriting fewer than all symbols of the first pre-existing watermark message includes removing the dither signal and embedding one or more symbols of the new watermark message by adding a new dither pattern to the primary content. In one exemplary embodiment, removing the dither signal includes using a noise gate that attenuates samples of the primary content having amplitudes that are below a particular threshold and allows samples of the primary content having amplitudes that are equal or greater than the particular threshold to remain unchanged.

According to one exemplary embodiment, overwriting fewer than all symbols of the first pre-existing message includes embedding a pre-defined symbol pattern indicative of an erasure watermark in the primary content, wherein, subsequent detection of the pre-defined symbol pattern by a watermark extractor, causes the watermark extractor to ignore the first pre-existing watermark message. For example, the pre-defined symbol pattern is reserved for signaling presence of a watermark that is used for erasing watermark messages in the primary content. In another exemplary embodiment, overwriting fewer than all symbols of the first pre-existing message includes modifying the primary content to invert one or more embedded symbol values of the first pre-existing watermark message. For example, wherein modifying the primary content includes inverting less than 10% of symbols of the first pre-existing watermark message.

In another exemplary embodiment, embedding one or more symbols of the new watermark message includes, subsequent to overwriting fewer than all symbols of the first pre-existing watermark message that renders the first pre-existing watermark undetectable, embedding symbols of a particular watermark message that is different from the one or more pre-existing watermark messages such that boundary locations of the symbols of the particular watermark message coincide with boundary locations of one or more symbols of the one or more pre-existing watermark messages. In one embodiment, embedding the one or more symbols of a new watermark message overwrites all symbols of a first pre-existing watermark message, and renders the first pre-existing watermark message undetectable upon a subsequent attempt to extract the first pre-existing watermark message from the primary content.

Another aspect of the disclosed embodiments relates to computer program product, embodied on one or more non-transitory computer readable media, that includes program code for receiving the primary content at a content distributor device, where the primary content includes one or more pre-existing watermark messages embedded in the primary content, and the one or more pre-existing watermark messages include a server code field and an interval code field that indicate availability of a first metadata associated with the primary content. The computer program product also includes program code for obtaining a first server code value and a first interval code value associated with the one or more pre-existing watermark messages, and program code for obtaining boundary locations of a plurality of symbols of the one or more pre-existing watermark messages in the primary content. The computer program code additionally includes program code for embedding one or more symbols of a new watermark message in the primary content such that boundary locations of the one or more symbols of the new watermark message coincide with boundary locations of one or more symbols of the one or more pre-existing watermark messages, the new watermark message also including a server code field and an interval code field that indicate availability of a second metadata associated with the primary content. The computer program product further includes program code for transmitting information associated with the new watermark message to a server device associated with the content distributor device, where the transmitted information includes timing information associated with the new watermark message, and program code for transmitting the primary content to the client device to enable access to the first or the second metadata at the client device upon recovery of the new watermark message The disclosed embodiments further allow interactions between multiple entities to enhance the delivery of metadata associated with a primary content to a client device. In this context, an aspect of the disclosed technology relates to a method that includes transmitting a primary content from a first content distributor device to a second content distributor device, where the primary content includes one or more pre-existing watermark messages including a server code field and an interval code field that indicate availability of a first metadata associated with the primary content. The method further includes receiving the primary content at a second content distributor device.

At the second content distributor device, the following operations are performed: obtaining a first server code value and a first interval code value associated with the one or more pre-existing watermark messages, obtaining boundary locations of a plurality of symbols of the one or more pre-existing watermark messages in the primary content, and using a watermark embedder (that is implemented at least partially in electronic circuits) to embed one or more symbols of a new watermark message in the primary content such that boundary locations of the one or more symbols of the new watermark message coincide with boundary locations of one or more symbols of the one or more pre-existing watermark messages. The new watermark message also includes a server code field and an interval code field that indicate availability of a second metadata associated with the primary content. Additionally, information associated with the new watermark message is transmitted to a server device associated with the content distributor device, where the transmitted information includes timing information associated with second trigger field, and the primary content is transmitted to a client device to enable access to the first or the second metadata at the client device upon recovery of the new watermark message.

At the client device, the primary content that is processed by the second distributor device is received, and the new watermark message is extracted to obtain a server code value and an interval code value of the new watermark message. Based on the server code value and the interval code value of the new watermark message, a request is initiated for the first metadata or the second metadata. Such a request can also result in reception of a first or a second program or service associated with the primary content.

A system associated with the disclosed embodiments also enables the delivery of enhanced metadata associated with a primary content, and includes a first content distributor device associated with a first distributor of multimedia content, coupled to a communication channel and configured to transmit a primary content to another device or entity. The system also includes a second content distributor device associated with a second distributor of multimedia content, coupled to a communication channel and configured to receive the primary content from the first content distributor device to a second content distributor device. The primary content includes one or more pre-existing watermark messages that a server code field and an interval code field that indicate availability of a first metadata associated with the primary content. The second content distributor device is further configured to obtain a first server code value and a first interval code value associated with the one or more pre-existing watermark messages, as well as boundary locations of a plurality of symbols of the one or more pre-existing watermark messages in the primary content. The second content distributor device is further configured to embed a new watermark message in the primary content such that boundary locations of symbols of the new watermark message coincide with boundary locations of one or more symbols of the one or more pre-existing watermark messages. The new watermark message includes a server code field and an interval code field that indicate availability of a second metadata associated with the primary content. The second content distributor device is further configured to transmit information associated with the new watermark message to a server device associated with the content distributor device, where the transmitted information includes timing information associated with new watermark message. The second content distributor device is also configured to transmit the primary content to one or more client devices.

The above noted system further includes a first client device that is configured to receive the primary content that is processed by the second distributor device, extract at least the new watermark message to obtain a server code value and an interval code value of the second watermark message. The first client device is also configured to initiate a request using the server code value and the interval code value of the second watermark message, and receive the first or the second metadata in response to the request.

It should be noted that the first distributor device, the second distributor device and the first client device, each may include a processor and memory that includes a processor executable code. The processor executable code, upon execution by the processor, configures each of those devices to perform the noted operations. Alternatively, or additionally, each of the first distributor device, the second distributor device and the first client device may be implemented using discrete or integrated hardware components, as discussed below in further detail.

Certain aspects of the disclosed embodiments can be implemented as a device that includes a processor, and a memory comprising processor executable code. The processor executable code, when executed by the processor, configures the device to perform any one of and/or all operations that are described in the present application.

Figure 7:
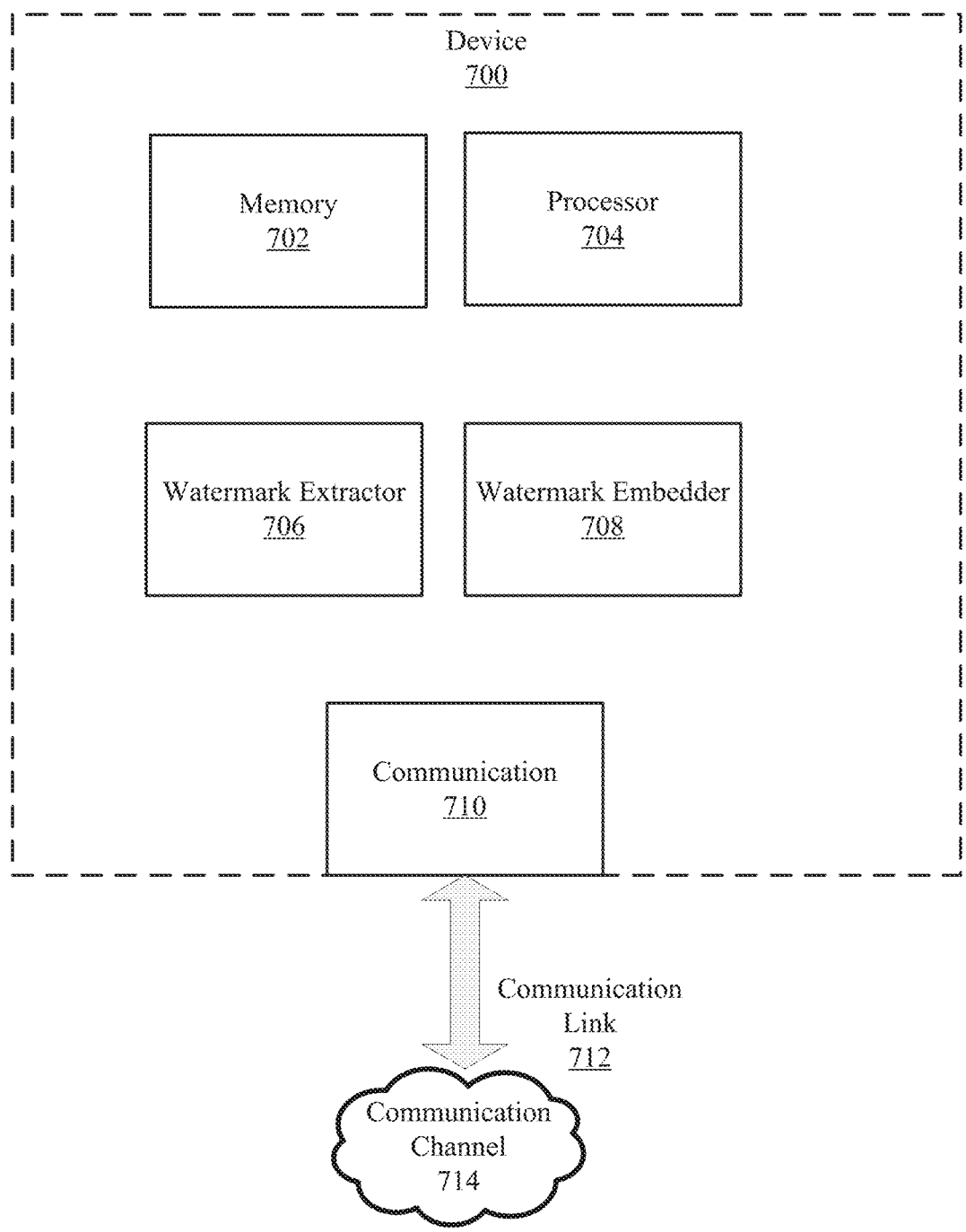
FIG. 7 illustrates a block diagram of a device for implementing various disclosed embodiments.

FIG. 7 illustrates a block diagram of a device 700 within which various disclosed embodiments may be implemented. The device 700 includes a processor 704, a memory 702 that is in communication with the processor 704, and a communication unit 710 that enables the exchange of data and information, directly or indirectly, through the communication link 712 to a communication channel 714 that allows the device 700 to send and receive information and data to other entities, devices, databases and networks. The communication unit 710 may provide wired and/or wireless communication capabilities in accordance with one or more communication protocols, and therefore it may comprise the proper transmitter/receiver, antennas, circuitry and ports, as well as the encoding/decoding capabilities that may be necessary for proper transmission and/or reception of data and other information. The device 700 can, for example, be implemented as part of a device at a content distributor that is capable of sending and receiving a primary content. The device 700 also includes a watermark extractor 706 that detects watermarks that are embedded in a content that is received by, or stored at, the device 700. The watermark embedder 708 embeds watermarks in a content that is received by, or stored at, the device 700. The processor 704 can configure the watermark extractor 706 and the watermark embedder 708 to enable detection and embedding of watermarks based on selected watermark embedding and extraction algorithms and parameters. The processor 704 can also configure the communication unit 710 and other components of the device 700 (not shown) to send and receive information, multimedia content and other signals. It should be noted that, for simplicity, not all the components and connections between the components are shown in FIG. 7.

Figure 8:
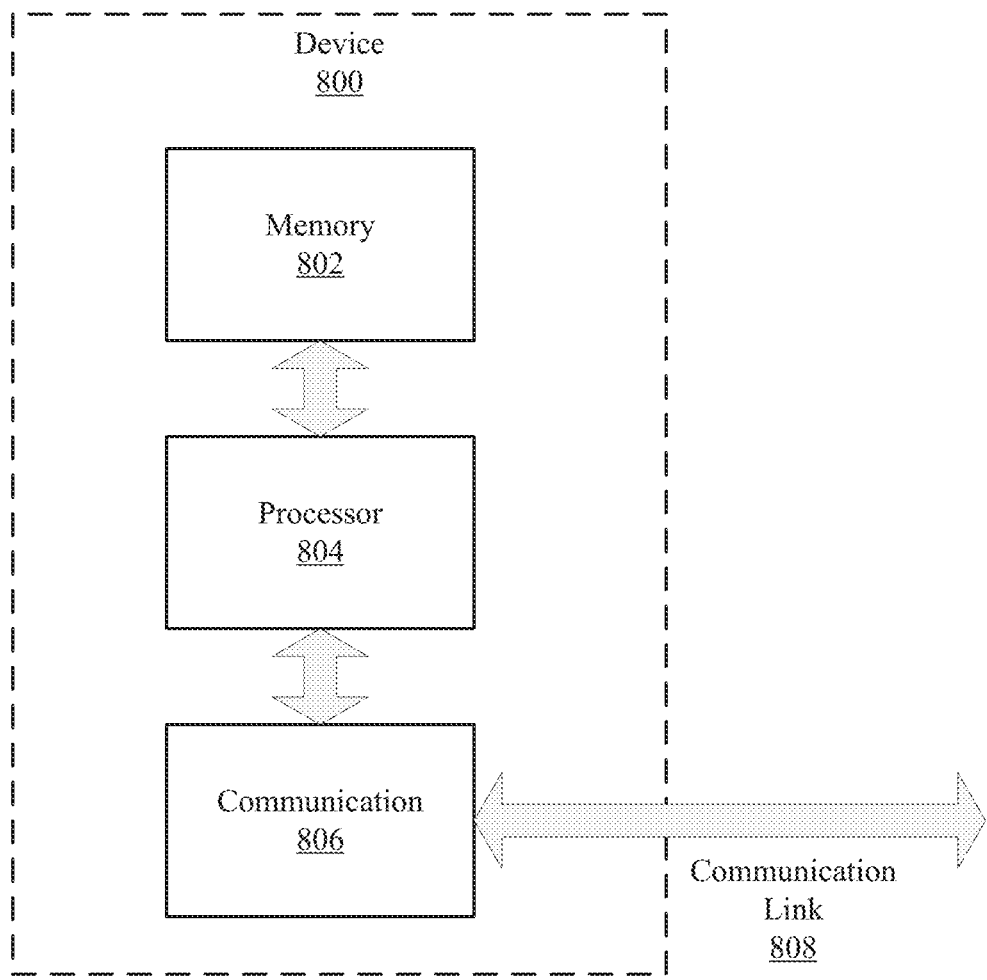
FIG. 8 illustrates a block diagram of a device for implementing various disclosed embodiments.

FIG. 8 illustrates a block diagram of a device 800 within which various disclosed embodiments may be implemented. The device 800 comprises at least one processor 804 and/or controller, at least one memory 802 unit that is in communication with the processor 804, and at least one communication unit 806 that enables the exchange of data and information, directly or indirectly, through the communication link 808 with other entities, devices, databases and networks. The communication unit 806 may provide wired and/or wireless communication capabilities in accordance with one or more communication protocols, and therefore it may comprise the proper transmitter/receiver, antennas, circuitry and ports, as well as the encoding/decoding capabilities that may be necessary for proper transmission and/or reception of data and other information. The exemplary device 800 of FIG. 8 may be integrated as part of any devices or components described in this document to carry out any of the disclosed methods.

The components or modules that are described in connection with the disclosed embodiments can be implemented as hardware, software, or combinations thereof. For example, a hardware implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application.

Various embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), Blu-ray Discs, etc. Therefore, the computer-readable media described in the present application include non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

For example, one aspect of the disclosed embodiments relates to a computer program product that is embodied on a non-transitory computer readable medium. The computer program product includes program code for carrying out any one or and/or all of the operations of the disclosed embodiments.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products, as well as in different sequential orders. Any embodiment may further be combined with any other embodiment.

What is claimed is:

1. A method for enabling delivery of metadata associated with a primary content to a client device, the method comprising:
   receiving the primary content at a content distributor device, the primary content including one or more pre-existing watermark messages embedded in the primary content, the one or more pre-existing watermark messages comprising a server code field and an interval code field that indicate availability of a first metadata associated with the primary content;
   obtaining a first server code value and a first interval code value associated with the one or more pre-existing watermark messages;
   obtaining boundary locations of a plurality of symbols of the one or more pre-existing watermark messages in the primary content;
   using a watermark embedder that is implemented at least partially in electronic circuits to embed one or more symbols of a new watermark message in the primary content such that boundary locations of the one or more symbols of the new watermark message coincide with boundary locations of one or more symbols of the one or more pre-existing watermark messages, the new watermark message also including a server code field and an interval code field that indicate availability of a second metadata associated with the primary content, wherein embedding the one or more symbols of the new watermark message overwrites fewer than all symbols of a first pre-existing watermark message, and renders the first pre-existing watermark message undetectable upon a subsequent attempt to extract the first pre-existing watermark message from the primary content;
   transmitting information associated with the new watermark message to a server device associated with the content distributor device, the transmitted information including timing information associated with the new watermark message, and
   transmitting the primary content to one or more client devices to enable access to the first or the second metadata at the one or more client devices upon recovery of the new watermark message.

2. The method of claim 1, wherein one or both of the following is true:
   a value of the server code field of the new watermark message differs from the first server code value, or
   a value of the interval code of the new watermark message differs from the first interval code value.

3. The method of claim 2, wherein
   the server code value and the interval code value associated with the new watermark message enable retrieval of a second program or service associated with the primary content, and
   the server code value and the interval code value associated with the one or more pre-existing watermark messages enable retrieval of a first program or service associated with the primary content.

4. The method of claim 3, wherein the first program or service or the second program or service is one of: an advertisement, a targeted advertisement, an interactive program, or a secondary video content.

5. The method of claim 2, wherein
   the server code value and the interval code value associated with the new watermark message enable retrieval of the second metadata that is different from the first metadata.

6. The method of claim 1, wherein:
   one or more pre-existing watermark messages include a trigger field that is indicative of a change in the first metadata, and
   embedding the one or more symbols of the new watermark message includes embedding a new trigger field associated with the new watermark message.

7. The method of claim 1, wherein at least one of: (a) the first server code value, (b) the first interval code value, or (c) the boundary locations of the plurality of symbols of the one or more pre-existing watermark messages is obtained using a watermark extractor to extract the plurality of symbols of the one or more pre-existing watermark message.

8. The method of claim 1, wherein at least one of: (a) the first server code value, (b) the first interval code value, or (c) the boundary locations of the plurality of symbols of the one or more pre-existing watermark messages is received at the content distributor device through a communication channel coupled to the content distributor device.

9. The method of claim 8, wherein at least one of: (a) the first server code value, (b) the first interval code value, or (c) the boundary locations of the plurality of symbols of the one or more pre-existing watermark messages is pushed to the content distributor device through the communication channel.

10. The method of claim 1, further comprising storing the first server code value and the first interval code value at the server device associated with the content distributor device to allow subsequent retrieval of the first metadata upon detection of the new watermark message by the one or more client devices.

11. The method of claim 10, further comprising receiving update information associated with the one or more pre-existing watermark messages, the update information including a new server code value or a new interval code value associated with the one or more pre-existing watermark messages that enable retrieval of: the first metadata, a first program or service, or an additional program or service, from a metadata server.

12. The method of claim 11, further comprising providing the update information to the one or more client devices in response to a request initiated by the one or more client devices.

13. The method of claim 1, further comprising:
using the first server code value and the first interval code value associated with the one more pre-existing watermark messages to retrieve the first metadata or a first program or service associated with primary content,
storing the first metadata, or the first program or service, at the server device associated with the content distributor device, and
providing the first metadata, the first program or service, or instructions for obtaining the first metadata or the first program or service, to the one or more client devices in response to a request initiated by the one or more client devices.

14. The method of claim 1, wherein the primary content is received from another distributor in distribution chain of the primary content.

15. The method of claim 1, wherein the primary content is received from one of a broadcast television network, a local television station, a cable television network, an online video service, or a content delivery network (CDN).

16. The method of claim 1, wherein the primary content includes at least one of: a syndicated program segment, a prerecorded programming, a live programming, a user generated video, or a streaming content.

17. The method of claim 1, wherein:
the content distributor device is located a local television station,
the primary content is received at the local television station from a national broadcaster, and
the one or more symbols of a new watermark message enable the one or more client devices to augment or replace the first metadata with the second metadata.

18. The method of claim 1, wherein embedding the one or more symbols of the new watermark message comprises inverting one or more symbols of a first pre-existing watermark message to signal existence of a new trigger value, such that upon a subsequent attempt to extract the first pre-existing watermark message from the primary content, the detected first pre-existing watermark message includes more than a predefined number of erroneous symbols, indicating an unreliable watermark.

19. The method of claim 18, wherein inverting one or more symbols of a first pre-existing watermark message includes inverting a symbol of the first pre-existing watermark message designated to carry the trigger field associated with the one or more pre-existing watermark messages.

20. The method of claim 1, wherein embedding one or more symbols of the new watermark message comprises:
subsequent to overwriting fewer than all symbols of the first pre-existing watermark message that renders the first pre-existing watermark undetectable, embedding symbols of a particular watermark message that is different from the one or more pre-existing watermark messages such that boundary locations of the symbols of the particular watermark message coincide with boundary locations of one or more symbols of the one or more pre-existing watermark messages.

21. The method of claim 1, wherein the first pre-existing watermark message is recoverable upon detection of the first pre-existing watermark message with less than a first number of erroneous watermark symbols, and
the watermark embedder overwrites a second number of symbols of the first pre-existing watermark message that equals or exceeds the first number.

22. The method of claim 1, wherein the first pre-existing watermark message comprises a plurality of parity symbols associated with an error correction code, and
the watermark embedder overwrites a first number of symbols of the first pre-existing watermark message that exceeds maximum number of symbols that can be corrected by the error correction code.

23. The method of claim 1, wherein
at least a portion of the first pre-existing watermark message is located within a segment of the primary content that includes a dither signal, and
overwriting fewer than all symbols of the first pre-existing watermark message includes removing the dither signal and embedding one or more symbols of the new watermark message by adding a new dither pattern to the primary content.

24. The method of claim 23, wherein removing the dither signal includes using a noise gate that attenuates samples of the primary content having amplitudes that are below a particular threshold and allows samples of the primary content having amplitudes that are equal or greater than the particular threshold to remain unchanged.

25. The method of claim 1, wherein overwriting fewer than all symbols of the first pre-existing message includes embedding a pre-defined symbol pattern indicative of an erasure watermark in the primary content, wherein, subsequent detection of the pre-defined symbol pattern by a watermark extractor, causes the watermark extractor to ignore the first pre-existing watermark message.

26. The method of claim 25, wherein the pre-defined symbol pattern is reserved for signaling presence of a watermark that is used for erasing watermark messages in the primary content.

27. The method of claim 1, wherein overwriting fewer than all symbols of the first pre-existing message includes modifying the primary content to invert one or more embedded symbol values of the first pre-existing watermark message.

28. The method of claim 27, wherein modifying the primary content includes inverting less than 10% of symbols of the first pre-existing watermark message.

29. A method for enhancing delivery of metadata associated with a primary content to a client device, the method comprising:
transmitting a primary content from a first content distributor device to a second content distributor device, wherein the primary content includes one or more pre-existing watermark messages comprising a server code field and an interval code field that indicate availability of a first metadata associated with the primary content;

receiving the primary content at a second content distributor device;

at the second content distributor device,
  obtaining a first server code value and a first interval code value associated with the one or more pre-existing watermark messages;
  obtaining boundary locations of a plurality of symbols of the one or more pre-existing watermark messages in the primary content;
  using a watermark embedder that is implemented at least partially in electronic circuits to embed one or more symbols of a new watermark message in the primary content such that boundary locations of the one or more symbols of the new watermark message coincide with boundary locations of one or more symbols of the one or more pre-existing watermark messages, the new watermark message also including a server code field and an interval code field that indicate availability of a second metadata associated with the primary content, wherein embedding the one or more symbols of the new watermark message overwrites fewer than all symbols of a first pre-existing watermark message, and renders the first pre-existing watermark message undetectable upon a subsequent attempt to extract the first pre-existing watermark message from the primary content;
  transmitting information associated with the new watermark message to a server device associated with the content distributor device, the transmitted information including timing information associated with the new watermark message, and
  transmitting the primary content to one or more client device to enable access to the first or the second metadata at the client device upon recovery of the new watermark message;

receiving, at the client device, the primary content that is processed by the second distributor device; and at the client device,
  extracting at least the new watermark message to obtain a server code value and an interval code value of the new watermark message, and
  using the server code value and the interval code value of the new watermark message to initiate a request for the first metadata or the second metadata.

30. A computer program product, embodied on one or more non-transitory computer readable media, comprising:
  program code for receiving the primary content at a content distributor device, the primary content including one or more pre-existing watermark messages embedded in the primary content, the one or more pre-existing watermark messages comprising a server code field and an interval code field that indicate availability of a first metadata associated with the primary content;
  program code for obtaining a first server code value and a first interval code value associated with the one or more pre-existing watermark messages;
  program code for obtaining boundary locations of a plurality of symbols of the one or more pre-existing watermark messages in the primary content;
  program code for embedding one or more symbols of a new watermark message in the primary content such that boundary locations of the one or more symbols of the new watermark message coincide with boundary locations of one or more symbols of the one or more pre-existing watermark messages, the new watermark message also including a server code field and an interval code field that indicate availability of a second metadata associated with the primary content, wherein embedding the one or more symbols of the new watermark message overwrites fewer than all symbols of a first pre-existing watermark message, and renders the first pre-existing watermark message undetectable upon a subsequent attempt to extract the first pre-existing watermark message from the primary content;
  program code for transmitting information associated with the new watermark message to a server device associated with the content distributor device, the transmitted information including timing information associated with the new watermark message, and
  program code for transmitting the primary content to one or more client devices to enable access to the first or the second metadata at the one or more client devices upon recovery of the new watermark message.

31. A device associated with a content distributor for enabling delivery of metadata associated with a primary content to a client device, the device comprising:
  a processor; and
  a memory including processor executable code, the processor executable code, upon execution by the processor, causes the device to:
  receive the primary content that includes one or more pre-existing watermark messages embedded therein, the one or more pre-existing watermark messages comprising a server code field and an interval code field that indicate availability of a first metadata associated with the primary content;
  obtain a first server code value and a first interval code value associated with the one or more pre-existing watermark messages;
  obtain boundary locations of a plurality of symbols of the one or more pre-existing watermark messages in the primary content;
  embed one or more symbols of a new watermark message in the primary content such that boundary locations of the one or more symbols of the new watermark message coincide with boundary locations of one or more symbols of the one or more pre-existing watermark messages, the new watermark message including a server code field and an interval code field that indicate availability of a second metadata associated with the primary content, wherein embedding of the one or more symbols of a new watermark message results in overwriting fewer than all symbols of a first pre-existing watermark message, and renders the first pre-existing watermark message undetectable upon a subsequent attempt to extract the first pre-existing watermark message from the primary content;
  transmit information associated with the new watermark message to a server device associated with the content distributor, the transmitted information including timing information associated with the new watermark message, and
  transmit the primary content to one or more client devices to enable access to the first or the second metadata at the one or more client devices upon recovery of the new watermark message.

32. The device of claim 31, wherein one or both of the following is true:
  a value of the server code field of the new watermark message differs from the first server code value, or a value of the interval code of the new watermark message differs from the first interval code value.

33. The device of claim 32, wherein:
the server code value and the interval code value associated with the new watermark message enable retrieval of a second program or service associated with the primary content, and
the server code value and the interval code value associated with the one or more pre-existing watermark messages enable retrieval of a first program or service associated with the primary content.

34. The device of claim 33, wherein the first program or service or the second program or service is one of: an advertisement, a targeted advertisement, an interactive program, or a secondary video content.

35. The device of claim 32, wherein the server code value and the interval code value associated with the new watermark message enable retrieval of the second metadata that is different from the first metadata.

36. The device of claim 31, wherein:
one or more pre-existing watermark messages include a trigger field that is indicative of a change in the first metadata, and
the processor executable code, upon execution by the processor, causes the device to embed a new trigger field associated with the new watermark message in the primary content.

37. The device of claim 31, comprising a watermark extractor, and wherein the processor executable code, upon execution by the processor, causes the watermark extractor to obtain at least one of: (a) the first server code value, (b) the first interval code value, or (c) the boundary locations of the plurality of symbols of the one or more pre-existing watermark messages by extracting the plurality of symbols of the one or more pre-existing watermark messages.

38. The device of claim 31, the processor executable code, upon execution by the processor, configures the device to obtain at least one of: (a) the first server code value, (b) the first interval code value, or (c) the boundary locations of the plurality of symbols of the one or more pre-existing watermark messages through a communication channel coupled to the content distributor device.

39. The device of claim 38, wherein at least one of: (a) the first server code value, (b) the first interval code value, or (c) the boundary locations of the plurality of symbols of the one or more pre-existing watermark messages is received in accordance with a push technology.

40. The device of claim 31, wherein the processor executable code, upon execution by the processor, causes the device to: store the first server code value and the first interval code value associated with the one or more pre-existing watermarks at the server device associated with the content distributor, wherein the first server code value and the first interval code value enable subsequent access to the first metadata upon detection of the new watermark message by the one or more client devices.

41. The device of claim 40, wherein the processor executable code, upon execution by the processor, configures the device to receive update information associated with the one or more pre-existing watermark messages, the update information including a new server code value or a new interval code value associated with the one or more pre-existing watermark messages that enable retrieval of: the first metadata, a first program or service, or an additional program or service, from a metadata server.

42. The device of claim 41, wherein the processor executable code, upon execution by the processor, causes the device transmit the update information to the one or more client devices in response to a request initiated by the one or more client devices.

43. The device of claim 31, wherein the processor executable code, upon execution by the processor, causes the device to:
retrieve the first metadata or a first program or service associated with primary content using the first server code value and the first interval code value associated with the one more pre-existing watermark messages,
store the first metadata, or the first program or service, at the server device associated with the content distributor device, and
provide the first metadata, the first program or service, or instructions for obtaining the first metadata or the first program or service, to the one or more client devices in response to a request initiated by the one or more client devices.

44. The device of claim 31, wherein the primary content is received from another distributor in distribution chain of the primary content.

45. The device of claim 31, wherein the primary content is received from one of a broadcast television network, a local television station, a cable television network, an online video service, or a content delivery network (CDN).

46. The device of claim 31, wherein the primary content includes at least one of: a syndicated program segment, a prerecorded programming, a live programming, a user generated video, or a streaming content.

47. The device of claim 31, wherein:
the device is located a local television station,
the primary content is received at the local television station from a national broadcaster, and
the one or more symbols of the new watermark message enable the one or more client devices to augment or replace the first metadata with the second metadata.

48. The device of claim 31, wherein the processor executable code, upon execution by the processor, causes the device to embed the one or more symbols of the new watermark message by inverting one or more symbols of a first pre-existing watermark message to signal existence of a new trigger value, such that upon a subsequent attempt to extract the first pre-existing watermark message from the primary content, the detected first pre-existing watermark message includes more than a predefined number of erroneous symbols, indicating an unreliable watermark.

49. The device of claim 48, wherein inverting one or more symbols of a first pre-existing watermark message includes inverting a symbol of the first pre-existing watermark message designated to carry the trigger field associated with the one or more pre-existing watermark messages.

50. The device of claim 31, wherein the processor executable code, upon execution by the processor, causes the device to:
subsequent to overwriting fewer than all symbols of the first pre-existing watermark message that renders the first pre-existing watermark undetectable, embed symbols of a particular watermark message that is different from the one or more pre-existing watermark messages such that boundary locations of the symbols of the particular watermark message coincide with boundary locations of one or more symbols of the one or more pre-existing watermark messages.

51. The device of claim 31, wherein the first pre-existing watermark message is recoverable upon detection of the first pre-existing watermark message with less than a first number of erroneous watermark symbols, and the processor executable code, upon execution by the processor, causes the device to overwrite a second number of symbols of the first pre-existing watermark message that equals or exceeds the first number.

52. The device of claim 31, wherein the first pre-existing watermark message comprises a plurality of parity symbols associated with an error correction code, and the processor executable code, upon execution by the processor, causes the device to overwrite a first number of symbols of the first pre-existing watermark message that exceeds maximum number of symbols that can be corrected by the error correction code.

53. The device of claim 31, wherein:

at least a portion of the first pre-existing watermark message is located within a segment of the primary content that includes a dither signal, and the processor executable code, upon execution by the processor, causes the device to remove the dither signal and embed one or more symbols of the new watermark message by adding a new dither pattern to the primary content.

54. The device of claim 53, wherein the processor executable code, upon execution by the processor, configures the device to remove the dither signal using a noise gate that attenuates samples of the primary content having amplitudes that are below a particular threshold and allows samples of the primary content having amplitudes that are equal or greater than the particular threshold to remain unchanged.

55. The device of claim 31, wherein the processor executable code, upon execution by the processor, causes the device to overwrite fewer than all symbols of the first pre-existing message by embedding a pre-defined symbol pattern indicative of an erasure watermark in the primary content, wherein, subsequent detection of the pre-defined symbol pattern by a watermark extractor, causes the watermark extractor to ignore the first pre-existing watermark message.

56. The device of claim 55, wherein the pre-defined symbol pattern is reserved for signaling presence of a watermark that is used for erasing watermark messages in the primary content.

57. The device of claim 31, wherein the processor executable code, upon execution by the processor, causes the device to overwrite fewer than all symbols of the first pre-existing message by modifying the primary content to invert one or more embedded symbol values of the first pre-existing watermark message.

58. The device of claim 57, wherein the processor executable code, upon execution by the processor, causes the device invert less than 10% of symbols of the first pre-existing watermark message.

59. A system for delivery of enhanced metadata associated with a primary content, comprising:

a first content distributor device associated with a first distributor of multimedia content, coupled to a communication channel and configured to transmit a primary content to another device or entity;

a second content distributor device associated with a second distributor of multimedia content, coupled to a communication channel and configured to receive the primary content from the first content distributor device to a second content distributor device, wherein the primary content includes one or more pre-existing watermark messages comprising a server code field and an interval code field that indicate availability of a first metadata associated with the primary content;

the second content distributor device further configured to obtain a first server code value and a first interval code value associated with the one or more pre-existing watermark messages, the second content distributor device further configured to obtain boundary locations of a plurality of symbols of the one or more pre-existing watermark messages in the primary content, the second content distributor device further configured to embed one or more symbols of a new watermark message in the primary content such that boundary locations of the one or more symbols of the new watermark message coincide with boundary locations of one or more symbols of the one or more pre-existing watermark messages, the new watermark message including a server code field and an interval code field that indicate availability of a second metadata associated with the primary content, wherein embedding the one or more symbols of the new watermark message overwrites fewer than all symbols of a first pre-existing watermark message, and renders the first pre-existing watermark message undetectable upon a subsequent attempt to extract the first pre-existing watermark message from the primary content, the second content distributor device further configured to transmit information associated with the new watermark message to a server device associated with the content distributor device, the transmitted information including timing information associated with new watermark message, and transmit the primary content to one or more client devices; and a first client device configured:

to receive the primary content that is processed by the second distributor device, extract at least the new watermark message to obtain a server code value and an interval code value of the second watermark message, initiate a request using the server code value and the interval code value of the second watermark message, and receive the first or the second metadata in response to the request.

60. A method for enabling delivery of metadata associated with a primary content to a client device, the method comprising:

receiving the primary content at a content distributor device, the primary content including one or more pre-existing watermark messages embedded in the primary content, the one or more pre-existing watermark messages comprising a server code field and an interval code field that indicate availability of a first metadata associated with the primary content;

obtaining a first server code value and a first interval code value associated with the one or more pre-existing watermark messages;

obtaining boundary locations of a plurality of symbols of the one or more pre-existing watermark messages in the primary content;

using a watermark embedder that is implemented at least partially in electronic circuits to embed one or more symbols of a new watermark message in the primary content such that boundary locations of the one or more symbols of the new watermark message coincide with boundary locations of one or more symbols of the one or more pre-existing watermark messages, the new watermark message also including a server code field and an interval code field that indicate availability of a second metadata associated with the primary content, wherein embedding the one or more symbols of a new watermark message overwrites all symbols of a first pre-existing watermark message, and renders the first pre-existing watermark message undetectable upon a subsequent attempt to extract the first pre-existing watermark message from the primary content;

transmitting information associated with the new watermark message to a server device associated with the content distributor device, the transmitted information including timing information associated with the new watermark message, and transmitting the primary content to one or more client devices to enable access to the first or the second metadata at the one or more client devices upon recovery of the new watermark message.

61. A method for enhancing delivery of metadata associated with a primary content to a client device, the method comprising:

transmitting a primary content from a first content distributor device to a second content distributor device, wherein the primary content includes one or more pre-existing watermark messages comprising a server code field and an interval code field that indicate availability of a first metadata associated with the primary content;

receiving the primary content at a second content distributor device;

at the second content distributor device,
    obtaining a first server code value and a first interval code value associated with the one or more pre-existing watermark messages;
    obtaining boundary locations of a plurality of symbols of the one or more pre-existing watermark messages in the primary content;
    using a watermark embedder that is implemented at least partially in electronic circuits to embed one or more symbols of a new watermark message in the primary content such that boundary locations of the one or more symbols of the new watermark message coincide with boundary locations of one or more symbols of the one or more pre-existing watermark messages, the new watermark message also including a server code field and an interval code field that indicate availability of a second metadata associated with the primary content, wherein embedding the one or more symbols of a new watermark message overwrites all symbols of a first pre-existing watermark message, and renders the first pre-existing watermark message undetectable upon a subsequent attempt to extract the first pre-existing watermark message from the primary content;
    transmitting information associated with the new watermark message to a server device associated with the content distributor device, the transmitted information including timing information associated with the new watermark message, and
    transmitting the primary content to one or more client device to enable access to the first or the second metadata at the client device upon recovery of the new watermark message;

receiving, at the client device, the primary content that is processed by the second distributor device; and at the client device,
    extracting at least the new watermark message to obtain a server code value and an interval code value of the new watermark message, and
    using the server code value and the interval code value of the new watermark message to initiate a request for the first metadata or the second metadata.

62. A computer program product, embodied on one or more non-transitory computer readable media, comprising:

program code for receiving the primary content at a content distributor device, the primary content including one or more pre-existing watermark messages embedded in the primary content, the one or more pre-existing watermark messages comprising a server code field and an interval code field that indicate availability of a first metadata associated with the primary content;

program code for obtaining a first server code value and a first interval code value associated with the one or more pre-existing watermark messages;

program code for obtaining boundary locations of a plurality of symbols of the one or more pre-existing watermark messages in the primary content;

program code for embedding one or more symbols of a new watermark message in the primary content such that boundary locations of the one or more symbols of the new watermark message coincide with boundary locations of one or more symbols of the one or more pre-existing watermark messages, the new watermark message also including a server code field and an interval code field that indicate availability of a second metadata associated with the primary content, wherein embedding the one or more symbols of a new watermark message overwrites all symbols of a first pre-existing watermark message, and renders the first pre-existing watermark message undetectable upon a subsequent attempt to extract the first pre-existing watermark message from the primary content;

program code for transmitting information associated with the new watermark message to a server device associated with the content distributor device, the transmitted information including timing information associated with the new watermark message, and program code for transmitting the primary content to the one or more client devices to enable access to the first or the second metadata at the one or more client devices upon recovery of the new watermark message.

63. A device associated with a content distributor for enabling delivery of metadata associated with a primary content to a client device, the device comprising:

a processor; and a memory including processor executable code, the processor executable code, upon execution by the processor, causes the device to:

receive the primary content that includes one or more pre-existing watermark messages embedded therein, the one or more pre-existing watermark messages comprising a server code field and an interval code field that indicate availability of a first metadata associated with the primary content;

obtain a first server code value and a first interval code value associated with the one or more pre-existing watermark messages;

obtain boundary locations of a plurality of symbols of the one or more pre-existing watermark messages in the primary content;

embed one or more symbols of a new watermark message in the primary content such that boundary locations of the one or more symbols of the new watermark message coincide with boundary locations of one or more symbols of the one or more pre-existing watermark messages, the new watermark message including a server code field and an interval code field that indicate availability of a second metadata associated with the primary content, wherein embedding the one or more symbols of a new watermark message overwrites all symbols of a first pre-existing watermark message, and renders the first pre-existing watermark message undetectable upon a subsequent attempt to extract the first pre-existing watermark message from the primary content;

transmit information associated with the new watermark message to a server device associated with the content distributor, the transmitted information including timing information associated with the new watermark message; and transmit the primary content to one or more client devices to enable access to the first or the second metadata at the one or more client devices upon recovery of the new watermark message.

64. A system for delivery of enhanced metadata associated with a primary content, comprising:

a first content distributor device associated with a first distributor of multimedia content, coupled to a communication channel and configured to transmit a primary content to another device or entity;

a second content distributor device associated with a second distributor of multimedia content, coupled to a communication channel and configured to receive the primary content from the first content distributor device to a second content distributor device, wherein the primary content includes one or more pre-existing watermark messages comprising a server code field and an interval code field that indicate availability of a first metadata associated with the primary content;

the second content distributor device further configured to obtain a first server code value and a first interval code value associated with the one or more pre-existing watermark messages, the second content distributor device further configured to obtain boundary locations of a plurality of symbols of the one or more pre-existing watermark messages in the primary content, the second content distributor device further configured to embed one or more symbols of a new watermark message in the primary content such that boundary locations of the one or more symbols of the new watermark message coincide with boundary locations of one or more symbols of the one or more pre-existing watermark messages, the new watermark message including a server code field and an interval code field that indicate availability of a second metadata associated with the primary content, wherein embedding the one or more symbols of a new watermark message overwrites all symbols of a first pre-existing watermark message, and renders the first pre-existing watermark message undetectable upon a subsequent attempt to extract the first pre-existing watermark message from the primary content, the second content distributor device further configured to transmit information associated with the new watermark message to a server device associated with the content distributor device, the transmitted information including timing information associated with new watermark message, and transmit the primary content to one or more client devices; and a first client device configured:
to receive the primary content that is processed by the second distributor device, extract at least the new watermark message to obtain a server code value and an interval code value of the second watermark message,
initiate a request using the server code value and the interval code value of the second watermark message, and
receive the first or the second metadata in response to the request.

\* \* \* \* \*